(12) United States Patent
Xue et al.

(10) Patent No.: US 11,405,918 B2
(45) Date of Patent: Aug. 2, 2022

(54) DATA TRANSMISSION METHOD, COMMUNICATIONS APPARATUS, AND STORAGE MEDIUM

(71) Applicant: HUAWEI TECHNOLOGIES CO., LTD., Shenzhen (CN)

(72) Inventors: Yifan Xue, Beijing (CN); Jinlin Peng, Shanghai (CN); Jian Wang, Beijing (CN); Haitao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 16/965,263

(22) PCT Filed: Feb. 1, 2019

(86) PCT No.: PCT/CN2019/074487
§ 371 (c)(1),
(2) Date: Jul. 27, 2020

(87) PCT Pub. No.: WO2019/157996
PCT Pub. Date: Aug. 22, 2019

(65) Prior Publication Data
US 2021/0076380 A1    Mar. 11, 2021

(30) Foreign Application Priority Data
Feb. 13, 2018 (CN) .......................... 201810150990.5

(51) Int. Cl.
*H04W 72/04*    (2009.01)
(52) U.S. Cl.
CPC ... *H04W 72/0453* (2013.01); *H04W 72/0406* (2013.01); *H04W 72/0466* (2013.01)
(58) Field of Classification Search
CPC ... H04L 1/1812; H04L 1/1896; H04L 1/1861; H04L 1/1854; H04L 1/1614;
(Continued)

(56) References Cited

U.S. PATENT DOCUMENTS

| 6,532,220 B1 * | 3/2003 | Carneal ............. H04B 7/18582 370/329 |
| 2016/0198471 A1 * | 7/2016 | Young .................. H04W 16/14 370/329 |

(Continued)

FOREIGN PATENT DOCUMENTS

| CN | 105659651 A | 6/2016 |
| CN | 106470398 A | 3/2017 |

(Continued)

OTHER PUBLICATIONS

R1-1720911 Sequans Communications,"Enhancements for DL preemption",3GPP TSG RAN WG1 Meeting #91, Reno, USA, Nov. 27-Dec. 1, 2017, total 8 pages.
Chinese Office Action issued in corresponding Chinese Application No. 201810150990.5, dated Nov. 12, 2020, pp. 1-6, The State Intellectual Property Office of People's Republic of China, Beijing, China.

(Continued)

*Primary Examiner* — Jung Liu
(74) *Attorney, Agent, or Firm* — Hauptman Ham, LLP

(57) ABSTRACT

A data transmission method includes transmitting, by a first communications apparatus, first data with a second communications apparatus on a first frequency resource. The method also includes sending, by the first communications apparatus, control information to the second communications apparatus. The control information is used to schedule a part or all of the first data transmitted between the first communications apparatus and the second communications apparatus on a second frequency resource. A first transmission mode supported by the first frequency resource is different from a second transmission mode supported by the second frequency resource. Alternatively, the first transmission mode is the same as the second transmission mode, and a first feedback quantity supported by the first frequency resource is different from a second feedback quantity supported by the second frequency resource.

20 Claims, 7 Drawing Sheets

(58) Field of Classification Search
CPC ..... H04L 1/1864; H04L 5/001; H04L 5/0053; H04L 5/0094; H04L 5/0055; H04L 5/0023; H04W 72/1289; H04W 28/04; H04W 72/1273
See application file for complete search history.

(56) References Cited

U.S. PATENT DOCUMENTS

| | | | | |
|---|---|---|---|---|
| 2018/0324779 | A1* | 11/2018 | Li | H04L 1/1664 |
| 2019/0103943 | A1* | 4/2019 | Wang | H04L 1/1861 |
| 2020/0280397 | A1* | 9/2020 | Gao | H04L 1/1854 |
| 2020/0295878 | A1* | 9/2020 | Choi | H04L 5/0053 |
| 2020/0404662 | A1* | 12/2020 | Zhang | H04L 25/03866 |

FOREIGN PATENT DOCUMENTS

| | | | |
|---|---|---|---|
| CN | 106941723 | A | 7/2017 |
| CN | 107154835 | A | 9/2017 |
| CN | 107645369 | A | 1/2018 |

OTHER PUBLICATIONS

R1-1720512 Nokia et al.,"On remaining aspects of NR CA/DC",3GPP TSG-RAN WG1 #91, Reno, Nevada, Nov. 27-Dec. 1, 2017,total 9 pages.
R1-1801281 RAN WG 1,"LS on correction to RRC parameters for NR",3GPP TSG RAN WG1 Meeting AH 1801, Vancouver, Canada, Jan. 22-26, 2018,total 4 pages.
R1-1718705 Sequans Communications,"On open issues for DL preemption",3GPP TSG RAN WG1 Meeting #90bis, Prague, CZ, Oct. 9-13, 2017,total 9 pages.
International Search Report issued in corresponding International Application No. PCT/CN2019/074487, dated Apr. 22, 2019, State Intellectual Property Office of the P.R. China, Beijing, China.
Chinese Office Action issued in corresponding Chinese Application No. 201810150990.5, dated Apr. 21, 2020, State Intellectual Property Office of the P.R. China, Beijing, China.
Notice of Allowance issued in corresponding Chinese Application No. 201810150990.5, dated Feb. 25, 2021, pp. 1-4.

* cited by examiner

DATA TRANSMISSION METHOD, COMMUNICATIONS APPARATUS, AND STORAGE MEDIUM

CROSS-REFERENCE TO RELATED APPLICATIONS

This application is a National Stage of International Application No. PCT/CN2019/074487, filed on Feb. 1, 2019, which claims priority to Chinese Patent Application No. 201810150990.5, filed on Feb. 13, 2018.

TECHNICAL FIELD

Embodiments of this application relate to the communications technologies, and in particular, to a data transmission method, a communications apparatus, and a storage medium.

BACKGROUND

In a fifth generation (5G) communications system, an independent cell includes one carrier used to transmit downlink data and 0 or at least one carrier used to transmit uplink data. When a network device needs to communicate with a terminal device by using a larger system bandwidth, the network device may aggregate carriers in a plurality of cells in a carrier aggregation (CA) manner, to communicate with the terminal device through the plurality of carriers. In a carrier aggregation scenario, each aggregated carrier is referred to as a component carrier (CC). The system bandwidth may be understood as a bandwidth obtained by adding up bandwidths of all CCs.

The foregoing bandwidth of the CC may be very large (for example, 200 MHz or 400 MHz). Because some terminal devices do not support such a large bandwidth, a concept of a bandwidth part (BWP) is supported in the future 5G communications system. In other words, the network device and the terminal device are supported in occupying a part of the system bandwidth for communication. The BWP herein may be classified into a downlink (DL) BWP and an uplink (UP) BWP. Currently, the network device may configure a plurality of DL BWPs and a plurality of UL BWPs for the terminal device, and activate at least one DL BWP and at least one UL BWP to communicate with the terminal device.

SUMMARY

When a network device configures a plurality of BWPs for a terminal device, how to configure transmission parameters of the plurality of BWPs by the network device is an urgent problem to be resolved.

Embodiments of this application provide a data transmission method, a communications apparatus, and a storage medium, used to resolve a technical problem of how to configure transmission parameters of a plurality of BWPs by a network device when the network device configures the plurality of BWPs for a terminal device.

According to a first aspect, an embodiment of this application provides a data transmission method. The method may be applied to a network device, or may be applied to a chip in a network device. The method is described below by using an example in which the method is applied to a network device. The method includes:

transmitting, by a network device, first data with a terminal device on a first frequency resource; and sending, by the network device, the control information to the terminal device, where the control information is used to schedule a part or all of the first data transmitted between the network device and the terminal device on a second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource.

According to the data transmission method provided in the first aspect, the network device may configure different transmission parameters (that is, transmission modes and feedback quantities) for different frequency resources, so that the network device may flexibly schedule the terminal device to use the different frequency resources for data transmission in different scenarios, to improve transmission efficiency and transmission performance.

In a possible design, the first transmission mode is a transport block (TB)-based transmission, and the second transmission mode is a code block group (CBG)-based transmission; and the control information includes a first indicator field, each bit of the first indicator field corresponds to a CBG of the first data, and is used to indicate whether the corresponding CBG is scheduled; or the first indicator field does not include valid information, for example, the first indicator field includes redundancy information, or the first indicator field includes other information, and the information is not used to indicate that specific data in the first data is scheduled; or when the control information is transmitted on the first frequency resource, the control information does not include the first indicator field.

According to the data transmission method provided in the possible design, the network device schedules different BWPs for the terminal device for data transmission during transmitting the first data twice, and when the transmission modes supported by the two BWPs are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, the first transmission mode is a code block group CBG-based transmission, and the second transmission mode is a transport block TB-based transmission; and the control information does not include a first indicator field, each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information. For example, the first indicator field includes redundancy information, or the first indicator field includes other information, and the information is not used to indicate that specific data in the first data is scheduled.

According to the data transmission method provided in the possible design, the network device schedules different BWPs for the terminal device for data transmission during transmitting the first data twice, and when the transmission modes supported by the two BWPs are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs; and the control information includes a first indicator field, the first indicator field occupies N bits, and each of first M bits in the N bits corresponds to a CBG of the first data, and is used to indicate whether the corresponding CBG is scheduled; or each of last M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

According to the data transmission method provided in the possible design, when the network device schedules different BWPs for the terminal device for data transmission during transmitting the first data twice, and the transmission modes supported by the two BWPs are the same but the feedback quantities are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs; and the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

According to the data transmission method provided in the possible design, when the network device schedules different BWPs for the terminal device for data transmission during transmitting the first data twice, and the transmission modes supported by the two BWPs are the same but the feedback quantities are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, when the first indicator field occupies N bits, the N bits are divided into x bits and y bits; and that each of the N bits corresponds to at least one CBG of the first data includes:

each of the x bits corresponds to a CBGs, and each of the y bits corresponds to b CBGs.

According to the data transmission method provided in the possible design, the network device is enabled to determine CBGs indicated by each bit, thereby improving efficiency of sending the control information by the network device. Correspondingly, the terminal device is also enabled to quickly determine the CBGs indicated by each bit in the first indicator field, to reduce time of processing the control information by the terminal device, and further reduce a latency of the data transmission, and the network device is enabled to calculate an RIV used to indicate a frequency domain resource, thereby improving the efficiency of the network device.

In a possible design, $$x = N - 1, a = \left\lceil \frac{M}{N} \right\rceil, \text{ and } y = 1, b = M - (N-1)\left\lceil \frac{M}{N} \right\rceil, \text{ or}$$

$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

According to the data transmission method provided in the possible design, the network device is enabled to determine CBGs indicated by each bit, thereby improving efficiency of sending the control information by the network device. Correspondingly, the terminal device is also enabled to quickly determine the CBGs indicated by each bit in the first indicator field, to reduce time of processing the control information by the terminal device, and further reduce a latency of the data transmission.

In a possible design, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs; and the control information includes a first indicator field, the first indicator field occupies N bits, and each of the N bits corresponds to a CBG in the N CBGs, and is used to indicate whether the corresponding CBG is scheduled.

According to the data transmission method provided in the possible design, when the network device schedules different BWPs for the terminal device for data transmission during transmitting the first data twice, and the transmission modes supported by the two BWPs are the same but the feedback quantities are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, the first transmission mode and the second transmission mode are code block group CBG-based transmissions, the first feedback quantity is M, the second feedback quantity is N, M and N are positive integers, and M is not equal to N; and the control information includes a first indicator field, the first indicator field does not include valid information, the first indicator field occupies N bits, or when the control information is transmitted on the first frequency resource, the first indicator field occupies M bits. For example, the first indicator field includes redundancy information, or the first indicator field includes other information, and the information is not used to indicate that specific data in the first data is scheduled.

According to the data transmission method provided in the possible design, the network device schedules different BWPs for the terminal device for data transmission during transmitting the first data twice, and the transmission modes supported by the two BWPs are the same but the feedback quantities are different, the network device may flexibly indicate currently scheduled data to the terminal device by using the control information, so that the network device may flexibly schedule the terminal device to use different frequency resources for data transmission in different scenarios, to improve transmission efficiency and transmission performance.

In a possible design, the method further includes:

transmitting, by the network device, the first data with the terminal device on the second frequency resource based on the control information.

According to the data transmission method provided in the possible design, the network device may configure different transmission parameters (that is, transmission modes and feedback quantities) for different frequency resources, so that the network device may flexibly schedule the terminal device to use the different frequency resources for data transmission with the network device in different scenarios, to improve transmission efficiency and transmission performance.

According to a second aspect, an embodiment of this application provides a data transmission method. The method may be applied to a terminal device, or may be applied to a chip in a terminal device. The method is described below by using an example in which the method is applied to a terminal device. The method includes:

transmitting, by a terminal device, first data with a network device on a first frequency resource;

receiving, by the terminal device, control information sent by the network device, where the control information is used to schedule a part or all of the first data transmitted between the network device and the terminal device on a second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource; and transmitting, by the terminal device, the first data with the network device on the second frequency resource based on the control information.

In a possible design, the first transmission mode is a transport block TB-based transmission, and the second transmission mode is a code block group CBG-based transmission; and the control information includes a first indicator field, each bit of the first indicator field corresponds to a CBG of the first data, and is used to indicate whether the corresponding CBG is scheduled; or the first indicator field does not include valid information, for example, the first indicator field includes redundancy information, or the first indicator field includes other information, and the information is not used to indicate that specific data in the first data is scheduled; or when the control information is transmitted on the first frequency resource, the control information does not include the first indicator field.

In a possible design, the first transmission mode is a code block group CBG-based transmission, and the second transmission mode is a transport block TB-based transmission; and the control information does not include a first indicator field, each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information. For example, the first indicator field includes redundancy information, or the first indicator field includes other information, and the information is not used to indicate that specific data in the first data is scheduled.

In a possible design, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs; and the control information includes a first indicator field, the first indicator field occupies N bits, and each of first M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs; and the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, when the first indicator field occupies N bits, the N bits are divided into x bits and y bits; and that each of the N bits corresponds to at least one CBG of the first data includes:

each of the x bits corresponds to a CBGs, and each of they bits corresponds to b CBGs.

In a possible design, $$x = N-1, a = \left\lceil \frac{M}{N} \right\rceil, \text{ and } y = 1, b = M - (N-1)\left\lceil \frac{M}{N} \right\rceil, \text{ or}$$

$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

In a possible design, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs; and the control information includes a first indicator field, the first indicator field occupies N bits, and each of the N bits corresponds to a CBG in the N CBGs, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, and M is not equal to N; and the control information includes a first indicator field, the first indicator field does not include valid information, the first indicator field occupies N bits, or when the control information is transmitted on the first frequency resource, the first indicator field occupies M bits. For example, the first indicator field includes redundancy information, or the first indicator field includes other information, and the information is not used to indicate that specific data in the first data is scheduled.

For beneficial effects of the data transmission method provided in the second aspect and the possible designs of the second aspect, refer to beneficial effects brought by the first aspect and the possible designs of the first aspect. Details are not described herein again.

In a possible design, when the terminal device is a recipient, the method further includes:

feeding back, by the terminal device, a receiving status of the first data by using the second transmission mode and the second feedback quantity.

According to the data transmission method provided in the possible design, when the network device schedules different BWPs for the terminal device for data transmission during transmitting the first data twice, and the transmission modes supported by the two BWPs are different, or the transmission modes supported by the two BWPs are the same but the feedback quantities are different, the terminal device may feed back a receiving status of scheduled data based on a transmission mode and a feedback quantity that are supported by a current BWP for data transmission, so that the network device may accurately obtain the receiving status of the first data based on the transmission mode and the feedback quantity that are supported by the current BWP for the data transmission, thereby improving efficiency of the data transmission.

In a possible design, when the terminal device is the recipient, the method further includes:

feeding back, by the terminal device by using a quantity of bits corresponding to CBGs in the first indicator field as a feedback quantity, a receiving status of a CBG corresponding to each bit when the control information includes the first indicator field, and the first indicator field is a valid indicator field.

According to the data transmission method provided in the possible design, when the network device schedules different BWPs for the terminal device for data transmission during transmitting the first data twice, and the transmission modes supported by the two BWPs are different, or the transmission modes supported by the two BWPs are the same but the feedback quantities are different, the terminal device may feed back a receiving status of scheduled data based on a transmission mode and a feedback quantity that are supported by a current BWP for data transmission, so that the network device may accurately obtain the receiving status of the first data based on the transmission mode and the feedback quantity that are supported by the current BWP for the data transmission, thereby improving efficiency of the data transmission.

In a possible design, when the terminal device is the recipient, the method further includes:

feeding back, by the terminal device, a receiving status of a TB of the first data when the control information does not include the first indicator field, or the control information includes the first indicator field, but the first indicator field does not include valid information.

According to the data transmission method provided in the possible design, when the network device schedules different BWPs for the terminal device for data transmission during transmitting the first data twice, and the transmission modes supported by the two BWPs are different, or the transmission modes supported by the two BWPs are the same but the feedback quantities are different, the terminal device may directly feed back the receiving status of the first data in a TB-based manner, so that the network device may accurately obtain the receiving status of the first data in the TB-based feedback manner, thereby simplifying a feedback process, and improving efficiency of the data transmission.

According to a third aspect, an embodiment of this application provides a communications apparatus. The communications apparatus includes:

a transceiver, configured to transmit first data on a first frequency resource; and a processor, further configured to send the control information by using the transceiver, where the control information is used to schedule a part or all of the first data transmitted on a second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource.

In a possible design, the first transmission mode is a transport block TB-based transmission, and the second transmission mode is a code block group CBG-based transmission; and the control information includes a first indicator field, each bit of the first indicator field corresponds to a CBG of the first data, and is used to indicate whether the corresponding CBG is scheduled; or the first indicator field does not include valid information, for example, the first indicator field includes redundancy information, or the first indicator field includes other information, and the information is not used to indicate that specific data in the first data is scheduled; or when the control information is transmitted on the first frequency resource, the control information does not include the first indicator field.

In a possible design, the first transmission mode is a code block group CBG-based transmission, and the second transmission mode is a transport block TB-based transmission; and the control information does not include a first indicator field, each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information. For example, the first indicator field includes redundancy information, or the first indicator field includes other information, and the information is not used to indicate that specific data in the first data is scheduled.

In a possible design, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs; and the control information includes a first indicator field, the first indicator field occupies N bits, and each of first M bits in the N bits corresponds to a CBG of the first data, and is used to indicate whether the corresponding CBG is scheduled; or each of last M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs; and the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, when the first indicator field occupies N bits, the N bits are divided into x bits and y bits; and that each of the N bits corresponds to at least one CBG of the first data includes:

each of the x bits corresponds to a CBGs, and each of they bits corresponds to b CBGs.

In a possible design, $$x = N - 18, a = \left\lceil \frac{M}{N} \right\rceil, \text{ and } y = 18, b = M - (N-18)\left\lceil \frac{M}{N} \right\rceil, \text{ or}$$

$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

In a possible design, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs; and the control information includes a first indicator field, the first indicator field occupies N bits, and each of the N bits corresponds to a CBG in the N CBGs, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, and M is not equal to N; and the control information includes a first indicator field, the first indicator field does not include valid information, the first indicator field occupies N bits, or when the control information is transmitted on the first frequency resource, the first indicator field occupies M bits. For example, the first indicator field includes redundancy information, or the first indicator field includes other information, and the information is not used to indicate that specific data in the first data is scheduled.

For beneficial effects of the communications apparatus provided in the third aspect and the possible designs of the third aspect, refer to beneficial effects brought by the first aspect and the possible designs of the first aspect. Details are not described herein again.

According to a fourth aspect, an embodiment of this application provides a communications apparatus. The communications apparatus includes:

a transceiver, configured to: transmit first data on a first frequency resource, and receive control information, where the control information is used to schedule a part or all of the first data transmitted on the second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource; and a processor, configured to control, based on the control information, the transceiver to transmit the first data on the second frequency resource.

In a possible design, the first transmission mode is a transport block TB-based transmission, and the second transmission mode is a code block group CBG-based transmission; and the control information includes a first indicator field, each bit of the first indicator field corresponds to a CBG of the first data, and is used to indicate whether the corresponding CBG is scheduled; or the first indicator field does not include valid information, for example, the first indicator field includes redundancy information, or the first indicator field includes other information, and the information is not used to indicate that specific data in the first data is scheduled; or when the control information is transmitted on the first frequency resource, the control information does not include the first indicator field.

In a possible design, the first transmission mode is a code block group CBG-based transmission, and the second transmission mode is a transport block TB-based transmission; and the control information does not include a first indicator field, each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information. For example, the first indicator field includes redundancy information, or the first indicator field includes other information, and the information is not used to indicate that specific data in the first data is scheduled.

In a possible design, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs; and the control information includes a first indicator field, the first indicator field occupies N bits, and each of first M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs; and the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

In a possible design, when the first indicator field occupies N bits, the N bits are divided into x bits and y bits; and that each of the N bits corresponds to at least one CBG of the first data includes:

each of the x bits corresponds to a CBGs, and each of they bits corresponds to b CBGs.

In a possible design, $$x = N - 1, a = \left\lceil \frac{M}{N} \right\rceil, \text{ and } y = 1, b = M - (N-1)\left\lceil \frac{M}{N} \right\rceil, \text{ or}$$

-continued
$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

In a possible design, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs; and the control information includes a first indicator field, the first indicator field occupies N bits, and each of the N bits corresponds to a CBG in the N CBGs, and is used to indicate whether the corresponding CBG is scheduled.

In a possible design, the first transmission mode and the second transmission mode are code block group CBG-based transmissions, the first feedback quantity is M, the second feedback quantity is N, M and N are positive integers, and M is not equal to N; and the control information includes a first indicator field, the first indicator field does not include valid information, the first indicator field occupies N bits, or when the control information is transmitted on the first frequency resource, the first indicator field occupies M bits. For example, the first indicator field includes redundancy information, or the first indicator field includes other information, and the information is not used to indicate that specific data in the first data is scheduled.

In a possible design, when the communications apparatus is a recipient, the transceiver is further configured to feed back a receiving status of the first data by using the second transmission mode and the second feedback quantity.

In a possible design, when the communications apparatus is the recipient, the transceiver is further configured to feed back, by using a quantity of bits corresponding to CBGs in the first indicator field as a feedback quantity, a receiving status of a CBG corresponding to each bit when the control information includes the first indicator field, and the first indicator field is a valid indicator field.

In a possible design, when the communications apparatus is the recipient, the transceiver is further configured to feed back a receiving status of a TB of the first data when the control information does not include the first indicator field, or the control information includes the first indicator field, but the first indicator field does not include valid information.

For beneficial effects of the communications apparatus provided in the fourth aspect and the possible designs of the fourth aspect, refer to beneficial effects brought by the second aspect and the possible designs of the second aspect. Details are not described herein again.

According to a fifth aspect, an embodiment of this application provides a communications apparatus. The communications apparatus includes: a processor, a memory, a transmitter, and a receiver; the transmitter and the receiver are coupled to the processor, the processor controls a sending action of the transmitter, and the processor controls a receiving action of the receiver; and the memory is configured to store computer-executable program code, and the program code includes an instruction; and when the processor executes the instruction, the instruction enables the communications device to perform the method according to the first aspect and the possible designs of the first aspect.

According to a sixth aspect, an embodiment of this application provides a communications apparatus. The communications apparatus includes: a processor, a memory, a transmitter, and a receiver; the transmitter and the receiver are coupled to the processor, the processor controls a sending action of the transmitter, and the processor controls a receiving action of the receiver; and the memory is configured to store computer-executable program code, and the program code includes an instruction; and when the processor executes the instruction, the instruction enables the communications device to perform the method according to the second aspect and the possible designs of the second aspect.

According to a seventh aspect, an embodiment of this application provides a chip. The chip stores a computer program, and when executed by a processor, the computer program performs the method according to the first aspect and the possible designs of the first aspect.

According to an eighth aspect, an embodiment of this application provides a chip. The chip stores a computer program, and when executed by a processor, the computer program performs the method according to the second aspect and the possible designs of the second aspect.

According to a ninth aspect, an embodiment of this application provides a computer program product including an instruction. When the instruction is run on a computer, the computer is enabled to perform the method according to the first aspect or the possible designs of the first aspect.

According to a tenth aspect, an embodiment of this application provides a computer program product including an instruction. When the instruction is run on a computer, the computer is enabled to perform the method according to the second aspect or the possible designs of the second aspect.

According to an eleventh aspect, an embodiment of this application provides a computer-readable storage medium. The computer-readable storage medium stores a computer program, and when executed by a processor, the computer program performs the method according to the first aspect or the possible designs of the first aspect.

According to a twelfth aspect, an embodiment of this application provides a computer-readable storage medium. The computer-readable storage medium stores a computer program, and when executed by a processor, the computer program performs the method according to the second aspect or the possible designs of the second aspect.

According to the data transmission method, the communications apparatus, and the storage medium provided in the embodiments of this application, the network device may configure different transmission parameters (that is, transmission modes and feedback quantities) for different frequency resources, so that the network device may flexibly schedule the terminal device to use the different frequency resources for data transmission in different scenarios, to improve transmission efficiency and transmission performance.

DESCRIPTION OF EMBODIMENTS

Figure 1:
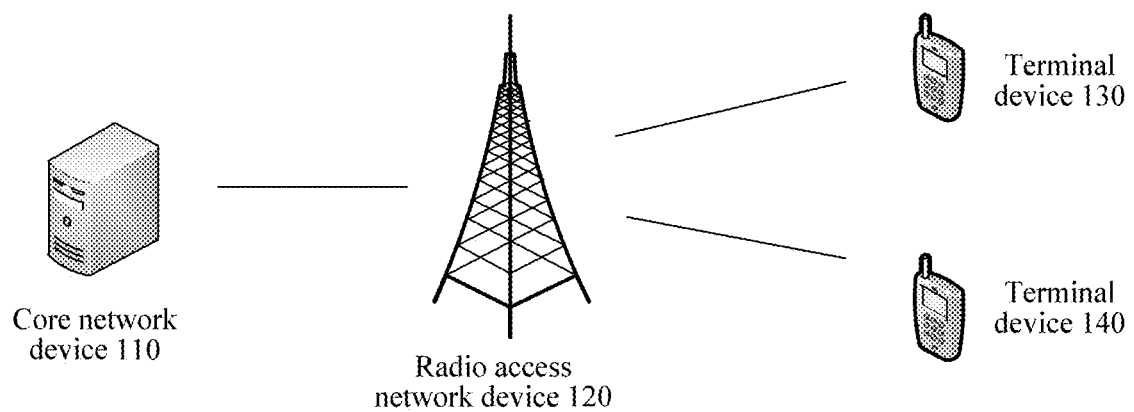
FIG. 1 is a schematic architectural diagram of a mobile communications system to which embodiments of this application are applied.

FIG. 1 is a schematic architectural diagram of a mobile communications system to which embodiments of this application are applied. As shown in FIG. 1, the mobile communications system may include a core network device 110, a radio access network device 120, and at least one terminal device (for example, a terminal device 130 and a terminal device 140 shown in FIG. 1). The terminal device is connected to the radio access network device 120 in a wireless manner, and the radio access network device 120 is connected to the core network device 110 in a wireless or wired manner. The core network device 110 and the radio access network device 120 may be different independent physical devices, or functions of the core network device 110 and logical functions of the radio access network device 120 may be integrated on a same physical device, or some of functions of the core network device 110 and some of functions of the radio access network device 120 may be integrated on one physical device. The terminal device may be in a fixed position, or may be movable. FIG. 1 is only the schematic diagram, and the mobile communications system may further include another network device, for example, may further include a wireless relay device and a wireless backhaul device, and the another network device is not shown in FIG. 1. A quantity of core network devices 110, radio access network devices 120, and terminal devices included in the mobile communications system is not limited in the embodiments of this application.

The radio access network device 120 is an access device that accesses the mobile communications system in a wireless manner, and may be a NodeB, an evolved NodeB (eNodeB), a base station in a 5G mobile communications system or new radio (NR) communications system, a base station in a future mobile communications system, an access node in a Wi-Fi system, or the like. A specific technology and a specific device form that are used by the radio access network device 120 are not limited in the embodiments of this application. In the embodiments of this application, the radio access network device 120 is referred to as a network device for short, and if there is no particular description, the network device in the embodiments of this application means the radio access network device 120. In addition, the terminology 5G may be equivalent to NR in the embodiments of this application.

The terminal device may also be referred to as a terminal Terminal, user equipment (UE), a mobile station (MS), a mobile terminal (MT), or the like. The terminal device may be a mobile phone, a tablet computer (pad), a computer having a wireless transmitting and receiving function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device 120 and the terminal device may be deployed on land, including an indoor or outdoor device, a handheld device, or a vehicle-mounted device; or may be deployed on a water surface; or may be deployed on a plane, a balloon, and a satellite in air. A scenario to which the radio access network device 120 and the terminal device are applied is not limited in the embodiments of this application.

The embodiments of this application may be applied to downlink signal transmission, or may be applied to uplink signal transmission, or may be applied to device-to-device (D2D) signal transmission. For the downlink signal transmission, a transmitting device is the radio access network device 120, and a corresponding receiving device is the terminal device. For uplink signal transmission, the transmitting device is a terminal device, and the corresponding receiving device is the radio access network device 120. For the D2D signal transmission, a transmitting device is a terminal device, and a corresponding receiving device is also a terminal device. A direction of signal transmission is not limited in the embodiments of this application.

Communication may be performed between the radio access network device 120 and the terminal device and between the terminal device and the terminal device through a licensed spectrum, or may be performed through an unlicensed spectrum, or may be performed through both a licensed spectrum and an unlicensed spectrum. Communication may be performed between the radio access network device 120 and the terminal device and between the terminal device and the terminal device through a spectrum sub-6 GHz, or may be performed through a spectrum above-6 GHz, or may be performed through both a spectrum sub-6 GHz and a spectrum above-6 GHz. A frequency resource used between the radio access network device 120 and the terminal device are applied is not limited in the embodiments of this application.

For example, the network device communicates with the terminal device, in the 5G communications system, an independent cell includes one carrier used to transmit downlink data and 0 or at least one carrier used to transmit uplink data. When the network device needs to communicate with the terminal device by using a larger system bandwidth, the network device may aggregate carriers in a plurality of cells in a carrier aggregation (CA) manner, to communicate with the terminal device through the plurality of carriers. In a carrier aggregation scenario, each aggregated carrier is referred to as a component carrier (CC). Because one CC is one single carrier, the single carrier may be equivalent to the CC in the embodiments of this application. The foregoing system bandwidth may be understood as a maximum frequency width (which may also be referred to as a bandwidth) of a carrier used when the network device communicates with the terminal device. For example, when the network device communicates with the terminal device by using a single CC, the system bandwidth is a bandwidth of the single CC. When the network device communicates with the terminal device in a carrier aggregation manner, the system bandwidth is a bandwidth obtained by adding up bandwidths of all CCs. When the network device communicates with the terminal device in a dual connectivity (DC) manner, the system bandwidth is a bandwidth obtained by adding up bandwidths of all two CCs for performing dual connectivity.

In the 5G communications system, the foregoing bandwidth of the CC may be very large (for example, 200 MHz or 400 MHz). Because some terminal devices do not support such a large bandwidth, a concept of a bandwidth part (bandwidth part, BWP) is supported in the future 5G communications system. In other words, the network device and the terminal device are supported in occupying a part of the system bandwidth for communication. For example, the network device may configure a BWP of 20 MHz for the terminal device, so that the terminal device may communicate with the network device by using the bandwidth of 20 MHz. It may be understood that, the foregoing 5G communications system may be a communications system that uses frequency division duplex (FDD) or time division duplex (TDD) for communication.

The foregoing BWP may be classified into a downlink (DL) BWP and an uplink (UP) BWP. Currently, the network device may configure a plurality of DL BWPs and a plurality of UL BWPs for the terminal device, and activate at least one DL BWP and at least one UL BWP to communicate with the terminal device. For example, the terminal device may receive a downlink signal on an active DL BWP (that is, an active DL BWP). The downlink signal herein includes, but is not limited to, downlink control signaling, downlink data, a synchronization signal (SS), a channel state information reference signal (CSI-RS), a demodulation reference signal (DMRS), a phase tracking reference signal (PTRS), and the like. Correspondingly, the terminal device may send an uplink signal on an active UL BWP. The uplink signal herein includes, but is not limited to, uplink control signaling, uplink data, a scheduling request (SR), a sounding reference signal (SRS), a channel state information (CSI)/a channel quality indicator (CQI), a phase tracking reference signal (PTRS), and the like. The BWP mentioned in the following application file refers to the DL BWP or the UP BWP, and is no longer specifically distinguished.

However, when the network device configures the plurality of BWPs for the terminal device, how to configure transmission parameters of the plurality of BWPs by the network device is an urgent problem to be resolved.

A hybrid automatic repeat request (HARQ) is a technology formed by combing forward error correction (FEC) encoding and an automatic repeat request (ARQ). Redundancy information may be added to transmitted data by using FEC. In this case, after receiving the data, a receive end may use an error-detection code, for example, cyclic redundancy check (CRC), to detect whether the received data has an error. Moreover, in a detection process, the receive end may correct some errors by using the redundancy information in the data, to reduce a quantity of times of data retransmission. If the receive end detects and determines that the data is correct (that is, the CRC check succeeds), the receive end may send a positive acknowledgement (ACK) to a transmit end, to notify that the data is correctly received. If the receive end detects and determines that the data is incorrect (that is, the CRC check fails), that is, the error cannot be corrected by using the FEC, the receive end may request, by using an ARQ mechanism, the transmit end to resend the data. Specifically, the receive end may send a negative acknowledgement (NACK) to the transmit end, to notify that the data fails to be received. After receiving the NACK of the data, the transmit end resends the data. The ACK and the NACK may be collectively referred to as HARQ-ACK information.

In a long term evolution (LTE) communications system, transmission of the uplink data and transmission of the downlink data are transport block (TB)-based transmissions. In some embodiments, a transmission mode is the TB-based transmission. In other words, when the receive end feeds back the HARQ-ACK information, for each TB, one bit is used to indicate a receiving status of the TB. For example, 1 represents receiving success (that is, the CRC check succeeds), and 0 represents receiving failure (that is, the CRC check fails). When the receiving status of the data is fed back in this manner, even only a part of the data in the TB fails to be received, the feedback is still that the entire TB fails to be received, so that the transmit end needs to retransmit the entire TB, causing relatively large overheads of data retransmission. It should be noted that, a quantity of TBs that may be transmitted by the transmit end during each transmission and a quantity of bits that are occupied by the receive end in the HARQ-ACK information to feed back the receiving status of the TB may be determined based on a feedback quantity. For example, when the feedback quantity is two, two TBs may be transmitted during each transmission between the network device and the terminal device, and correspondingly, the receive end may occupy two bits in the HARQ-ACK information to feed back a receiving status of the two TBs. The feedback quantity may be specifically determined based on configuration of the communications system.

In addition to the TB-based transmission, a code block group (CBG)-based transmission is also introduced in the 5G communications system. In other words, transmission modes in the 5G communications system include the TB-based transmission and the CBG-based transmission. In the CBG-based transmission, a code block (CB) in one TB is divided into one or more CBGs, and each CBG includes at least one CB. In this case, when the receive end feeds back the HARQ-ACK information, for each CBG, one bit is used to indicate a receiving status of the CBG (that is, receiving success or receiving failure). In other words, a quantity of bits that are occupied in the HARQ-ACK information depends on a quantity of CBGs. Therefore, in the embodiments of this application, a maximum quantity of CBGs that are configured by the network device for the terminal device may also be referred to as the feedback quantity. If there is no particular description, in the embodiments of this application, the maximum quantity of CBGs that are configured by the network device for the terminal device may be equal to the feedback quantity.

In this scenario, when data in the TB fails to be received, the transmit end may retransmit only the CBG that fails to be received, and does not need to retransmit the entire TB, thereby reducing overheads of data retransmission. It should be noted that, a maximum quantity of CBGs into which one TB may be divided by the transmit end during each transmission and a quantity of bits that are occupied by the receive end in the HARQ-ACK information to feed back a receiving status of the CBGs of the TB may be determined based on the feedback quantity. For example, when the feedback quantity is five, the maximum quantity of CBGs into which one TB may be divided is five during each transmission between the network device and the terminal device. Correspondingly, the receive end may occupy five bits in the HARQ-ACK information to feed back a receiving status of the five CBGs. The feedback quantity may be specifically determined based on configuration of the communications system.

Therefore, according to the data transmission method provided in this embodiment of this application, different transmission parameters (that is, transmission modes and feedback quantities) may be configured for two BWPs, so that the network device may flexibly schedule the terminal device to use different BWPs for data transmission in different scenarios, to improve transmission efficiency and transmission performance. It may be understood that, the method in the embodiments of this application may be applied to a scenario in which the network device communicates with the terminal device, or may be applied to a scenario in which D2D communication is performed between the terminal device and the terminal device. In the scenario in which the network device communicates with the terminal device, a first communications apparatus in the method in the embodiments of this application may be the network device, or may be a chip in the network device. A second communications apparatus in the method in the embodiments of this application may be the terminal device, or may be a chip in the terminal device. In the scenario in which the terminal device communicates with the terminal device, a first communications apparatus in the method in the embodiments of this application may be the terminal device on one side, or may be a chip in the terminal device. A second communications apparatus in the method in the embodiments of this application may be the terminal device on the other side, or may be a chip in the terminal device.

The technical solutions of this application are described in detail by using some embodiments and by using an example in which the first communications apparatus is the network device and the second communications apparatus is the terminal device in the following application file. The following several embodiments may be combined with each other, and a same or similar concept or process may not be described repeatedly in some embodiments.

Figure 2:
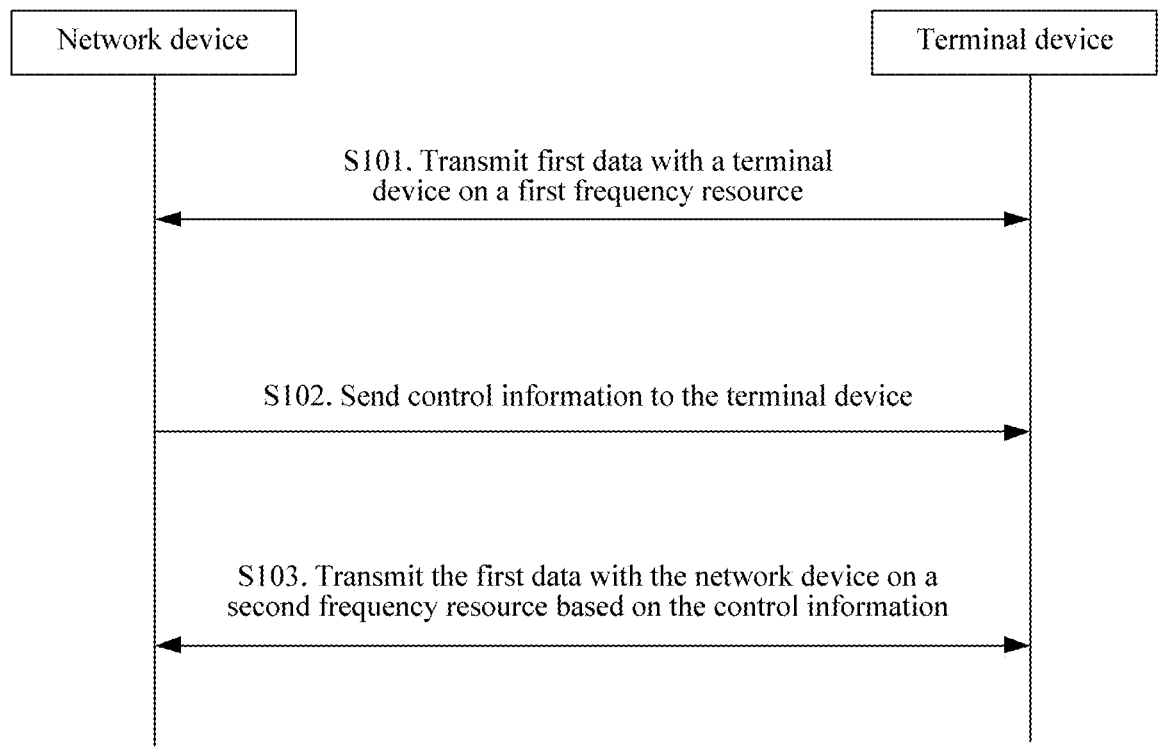
FIG. 2 is a signaling flowchart of a data transmission method according to an embodiment of this application.

FIG. 2 is a signaling flowchart of a data transmission method according to an embodiment of this application. As shown in FIG. 2, the method may include the following steps.

S101. A network device transmits first data with a terminal device on a first frequency resource.

S102. The network device sends control information to the terminal device.

The control information is used to schedule a part or all of the first data transmitted between the network device and the terminal device on a second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource.

S103. The terminal device transmits the first data with the network device on a second frequency resource based on the control information.

In this embodiment, the network device may configure a plurality of frequency resources for the terminal device, and may configure different transmission parameters, that is, transmission modes and/or feedback quantities, for different frequency resources. The frequency resource herein may be, for example, different BWPs of a same CC, or may be BWPs of different CCs, or may be different CCs.

By using different BWPs of a same CC as an example, the network device may configure a transmission mode of a BWP 1 of the CC as a CBG-based transmission, and configure a transmission mode of a BWP 2 of the CC as a TB-based transmission. Alternatively, the network device may configure a transmission mode of a BWP 1 of the CC as a TB-based transmission, and configure a transmission mode of a BWP 2 of the CC as a CBG-based transmission. Alternatively, the network device may configure a transmission mode of a BWP 1 and a transmission mode of a BWP 2 of the CC as CBG-based transmission, but feedback quantities of the two BWPs are different. It may be understood that, when the transmission modes of the two BWPs of the same CC are different, the feedback quantities of the two BWPs may be the same or may be different.

Figure 3:
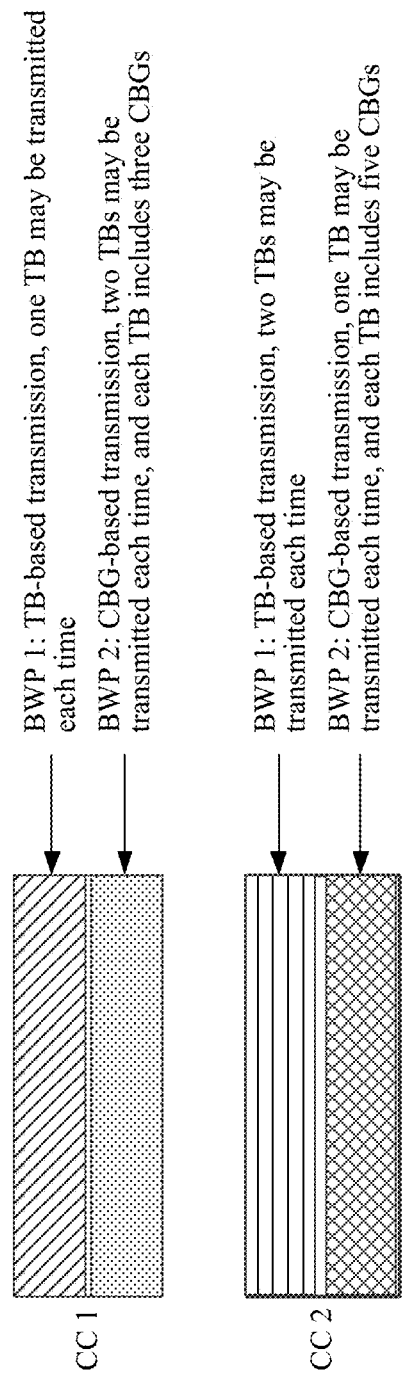
FIG. 3 is a schematic diagram of distribution of frequency resources according to an embodiment of this application.

FIG. 3 is a schematic diagram of distribution of frequency resources according to an embodiment of this application. As shown in FIG. 3, by using a CC 1 and a CC 2 as an example, each of the CC 1 and the CC 2 includes a BWP 1 and a BWP 2. In this example, a transmission mode that is of the BWP 1 of the CC 1 and that is configured by a network device is a TB-based transmission, a transmission quantity is one (that is, one TB may be transmitted during each data transmission), and a feedback quantity is one (that is, HARQ-ACK information occupies one bit to feed back a receiving status of the TB). A transmission mode that is of the BWP 2 of the CC 1 and that is configured by the network device is a CBG-based transmission, a transmission quantity is two (that is, two TBs may be transmitted during each data transmission), and a feedback quantity is three (that is, each TB is divided into three CBGs, and the HARQ-ACK information occupies three bits to feed back a receiving status of the CBGs of the TB). A transmission mode that is of the BWP 1 of the CC 2 and that is configured by the network device is a TB-based transmission, a transmission quantity is two (that is, two TBs may be transmitted during each data transmission), and a feedback quantity is two (that is, HARQ-ACK information occupies two bits to feed back a receiving status of the two TBs). A transmission mode that is of the BWP 2 of the CC 2 and that is configured by the network device is a CBG-based transmission, a transmission quantity is one (that is, one TB may be transmitted during each data transmission), and a feedback quantity is five (that is, each TB is divided into five CBGs, and the HARQ-ACK information occupies five bits to feed back a receiving status of the CBGs of the TB).

When first data is transmitted between the network device and a terminal device, after the $k^{th}$ transmission of the first data between the network device and the terminal device on a first BWP, the network device may schedule, by using control information, the terminal device to perform the $(k+1)^{th}$ transmission of the first data (transmission of a part or all of the first data) with the network device on a second BWP, to flexibly schedule the terminal device to use different BWPs for data transmission, thereby improving transmission efficiency and transmission performance. In this manner, when retransmitting the same data, the terminal device may use a different BWP for data transmission. For example, when load of the first BWP is greater than a preset threshold, the network device may schedule, by using the control information, the terminal device to perform retransmission of the first data on the second BWP having relatively small load when scheduling the terminal device to perform the $(k+1)^{th}$ transmission of the first data. In other words, the first BWP having heavy load is no longer allocated to the terminal device for use to retransmit the first data, and the BWP having relatively small load is allocated to the terminal device to perform data retransmission. Load of each BWP is balanced, to improve data transmission efficiency and transmission performance. Alternatively, when channel quality of the first BWP is relatively poor, the network device may schedule, by using the control information, the terminal device to perform retransmission of the first data with the network device on the BWP having relatively good channel quality when scheduling the terminal device to perform the $(k+1)^{th}$ transmission of the first data. In other words, the first BWP having poor channel quality is no longer allocated to the terminal device for use to retransmit the first data, and the BWP having good channel quality is allocated to the terminal device to perform data retransmission. In this manner, the data transmission efficiency and transmission performance may be improved.

In addition, a triggering condition of sending the control information by the network device is not limited in this embodiment. For example, when the network device and the terminal device repeatedly transmit the first data a plurality of times to ensure transmission reliability of the first data (that is, in a process of transmitting the first data the plurality of times, a receive end does not feed back a receiving status of the first data to a transmit end), the network device may directly send the control information after transmission of the first data on the first BWP 1 is completed and a transmission quantity of times of the first data does not reach a preset quantity of times.

Alternatively, when the network device and the terminal device send the first data in an HARQ-ACK information-based feedback manner, the network device may obtain a receiving status of the first data transmitted on the BWP 1 (that is, receiving success or receiving failure), and the network device may further send the control information when a part or all of the first data fails to be received. Correspondingly, a manner in which the network device obtains the receiving status of the first data is not limited in this embodiment. For example, when the network device is the transmit end, and the terminal device is the receive end, the network device may obtain the receiving status of the first data by receiving the receiving status of the first data fed back by the terminal device. When the network device is the receive end, and the terminal device is the transmit end, the network device may determine the receiving status of the first data by detecting the first data by the network device.

According to the data transmission method provided in this embodiment of this application, the network device may configure different transmission parameters (that is, transmission modes and feedback quantities) for different frequency resources, so that the network device may flexibly schedule the terminal device to use the different frequency resources for data transmission in different scenarios, to improve transmission efficiency and transmission performance.

Conventionally, when the terminal device is configured to use the CBG-based transmission to transmit data, the control information sent by the network device to the terminal device may further include a CBG transmission indication (CBGTI) field. Each bit in the CBGTI corresponds to a CBG, and is used to indicate whether the corresponding CBG is scheduled and transmitted. For example, a quantity of CBGs for transmitting downlink data by the terminal device configured by the network device is five. That is, the feedback quantity is five. In this scenario, the CBGTI field of the control information may occupy five bits, and each bit corresponds to a CBG, and is used to indicate whether the corresponding CBG is scheduled. For example, when the network device sends the downlink data to the terminal device for the first time, the CBGTI field in the control information may be 11111, and is used to indicate that five CBGs are currently scheduled and transmitted. If the terminal device feeds back to the base station that first three CBGs are correctly received and last two CBGs fail to be received after receiving the downlink data, the network device may indicate 00011 in the CBGTI during the second transmission, to indicate to the terminal device that only the last two CBGs are currently transmitted.

However, in conventional transmissions, when the network device schedules different BWPs for the terminal device for data transmission during transmitting the first data twice, and the transmission modes supported by the two BWPs are different, or the transmission modes supported by the two BWPs are the same but the feedback quantities are different, how to indicate, by using the control information, currently scheduled data by the network device to the terminal device is not described.

How to indicate, by using the control information, the currently scheduled data by the network device to the terminal device is described below by using the BWP 1 (that is, the first BWP) and the BWP 2 (that is, the second BWP) as an example in this embodiment of this application. It is assumed that transmission on the BWP 1 is the $k^{th}$ transmission of the first data, and transmission on the BWP 2 is the $(k+1)^{th}$ transmission of the first data. The BWP 1 and the BWP 2 may be different BWPs of a same CC, or may be BWPs of different CCs, or the like.

Scenario 1: A first transmission mode supported by the BWP 1 is different from a second transmission mode supported by the BWP 2.

Figure 4A:
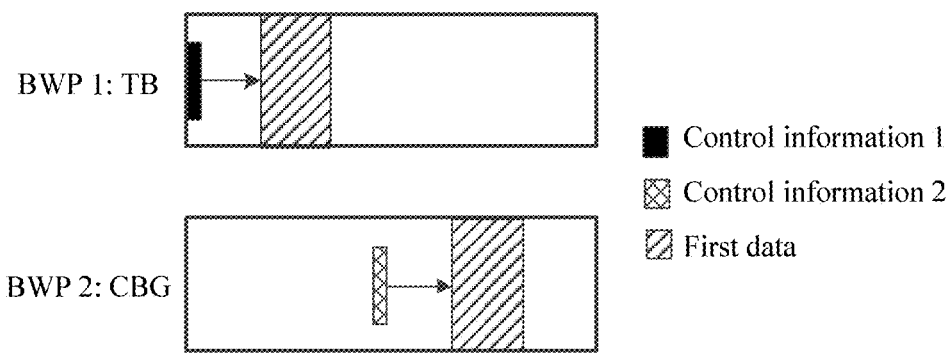
FIG. 4A is a schematic diagram 1 of data transmission according to an embodiment of this application.
Figure 4B:
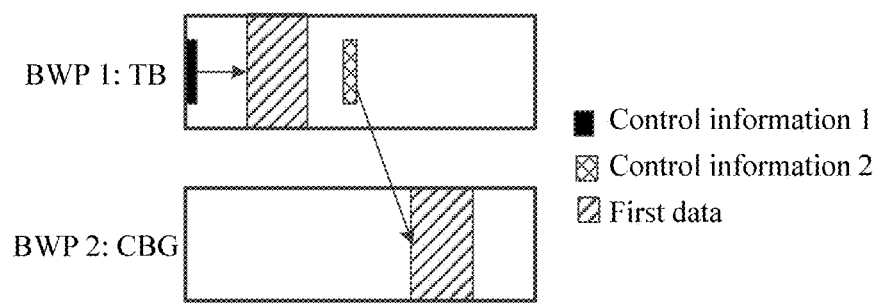
FIG. 4B is a schematic diagram 2 of data transmission according to an embodiment of this application.

Case 1: FIG. 4A is a schematic diagram 1 of data transmission according to an embodiment of this application. FIG. 4B is a schematic diagram 2 of data transmission according to an embodiment of this application. As shown in FIG. 4A and FIG. 4B, after the network device and the terminal device transmit the first data on the BWP 1 based on a TB, the network device schedules, by using the control information, the network device and the terminal device to transmit all of the first data on the BWP 2 based on a CBG. In other words, the first transmission mode supported by the BWP 1 is TB-based transmission, and the second transmission mode supported by the BWP 2 is CBG-based transmission. Optionally, the network device may send the control information, for example, control information 2 shown in FIG. 4A, to the terminal device on the BWP 1. The network device may alternatively send the control information, for example, control information 2 shown in FIG. 4B, to the terminal device on the BWP 2. Control information 1 shown in FIG. 4A and FIG. 4B is the control information used to schedule the first data transmitted between the network device and the terminal device on the BWP 1.

In this embodiment, because the $k^{th}$ transmission is the TB-based transmission, even though the network device and the terminal device send the first data in an HARQ-ACK information-based feedback manner, and only a part of the first data fails to be received, the entire first data still needs to be retransmitted in the $(k+1)^{th}$ transmission. Therefore, all CBGs of the first data need to be transmitted when the network device transmits the first data with the terminal device on the BWP 2 based on the CBG. Therefore, in the following several manners, the network device may indicate, by using the control information, that specific data in the first data is transmitted on the BWP 2. Details are as follows:

Manner 1: The control information sent by the network device to the terminal device may include a first indicator field. Each bit of the first indicator field corresponds to a CBG of the first data, and is used to indicate whether the corresponding CBG is scheduled and transmitted on the BWP 2. It may be understood that, the terminology of the CBGTI in the foregoing communications system may be still used for the first indicator field in a 5G communications system. A name of the first indicator field in each communications system is not limited in this embodiment of this application.

A quantity of bits included in the first indicator field may be specifically determined based on a second feedback quantity supported by the BWP 2. The feedback quantity may also indicate a quantity of CBGs into which data in the first data is divided and a quantity of bits in HARQ-ACK information used to feed back the receiving status of the first data when the first data is transmitted on the BWP 2. In this implementation, when the terminal device is the receive end, and the network device sends the first data with the terminal device in the HARQ-ACK information-based feedback manner, after receiving all of the first data sent by the network device on the BWP 2, the terminal device may feed back a receiving status of each CBG of the first data by using the second transmission mode and the second feedback quantity that are supported by the BWP 2.

An example in which the second feedback quantity is three is used, in other words, the data in the first data is divided into three CBGs when the first data is transmitted on the BWP 2. In this case, the first indicator field may include three bits, and each bit corresponds to a CBG, and is used to indicate whether the corresponding CBG is scheduled. When a value is 1, it indicates that the corresponding CBG is scheduled. In this example, the first indicator field may be 111. Correspondingly, when the terminal device is the receive end, and the network device sends the first data with the terminal device in the HARQ-ACK information-based feedback manner, the terminal device feeds back a receiving status of each CBG of the first data by using three bits in the HARQ-ACK information.

Manner 2: The control information sent by the network device to the terminal device may include a first indicator field, but the first indicator field does not include valid information. For example, the first indicator field includes redundancy information, or the first indicator field includes other information, and the information is not used to indicate that specific data in the first data is scheduled. In this scenario, after receiving the control information, the terminal device does not read, from the first indicator field, information indicating that specific data in the first data is transmitted. In this implementation, the network device may implicitly indicate that all of the first data is scheduled and transmitted on the BWP 2.

Optionally, when the terminal device is the receive end, and the network device sends the first data with the terminal device in the HARQ-ACK information-based feedback manner, after receiving all of the first data sent by the network device on the BWP 2, the terminal device may feed back a receiving status of a TB of the first data. That is, the terminal device processes the first data through the TB-based transmission, in other words, the terminal device performs a feedback for the first data by using the TB rather than the CBG as a unit. Alternatively, after receiving all of the first data sent by the network device on the BWP 2, the terminal device may feed back a receiving status of each CBG of the first data by using the second transmission mode and the second feedback quantity that are supported by the BWP 2.

Manner 3: When the control information is transmitted on the BWP 1, the control information sent by the network device to the terminal device does not include a first indicator field, to ensure that sizes of the control information on the same BWP are the same. The sizes of the control information on the same BWP are the same, so that a quantity of times that the terminal device performs blind detection for the control information may be reduced, thereby reducing power consumption of the terminal device. In this implementation, the network device may implicitly indicate, by using a size of the control information, that all of the first data is scheduled and transmitted on the BWP 2.

Optionally, when the terminal device is the receive end, and the network device sends the first data with the terminal device in the HARQ-ACK information-based feedback manner, after receiving all of the first data sent by the network device on the BWP 2, the terminal device may feed back a receiving status of a TB of the first data. That is, the terminal device processes the first data through the TB-based transmission, in other words, the terminal device performs a feedback for the first data by using the TB rather than the CBG as a unit. Alternatively, after receiving all of the first data sent by the network device on the BWP 2, the terminal device may feed back a receiving status of each CBG of the first data by using the second transmission mode and the second feedback quantity that are supported by the BWP 2.

Figure 5A:
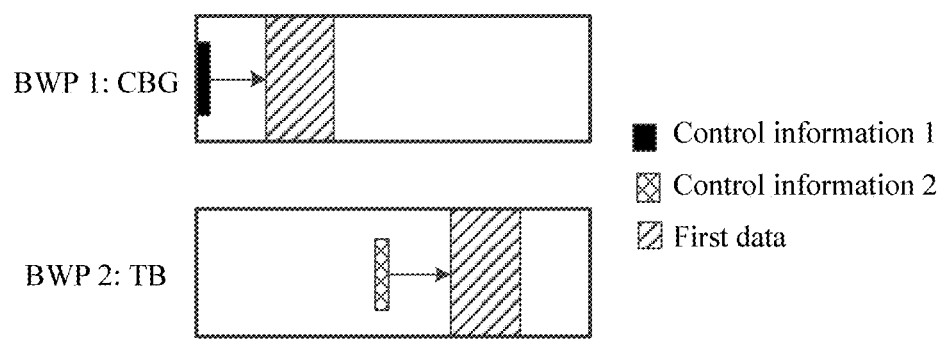
FIG. 5A is a schematic diagram 3 of data transmission according to an embodiment of this application.
Figure 5B:
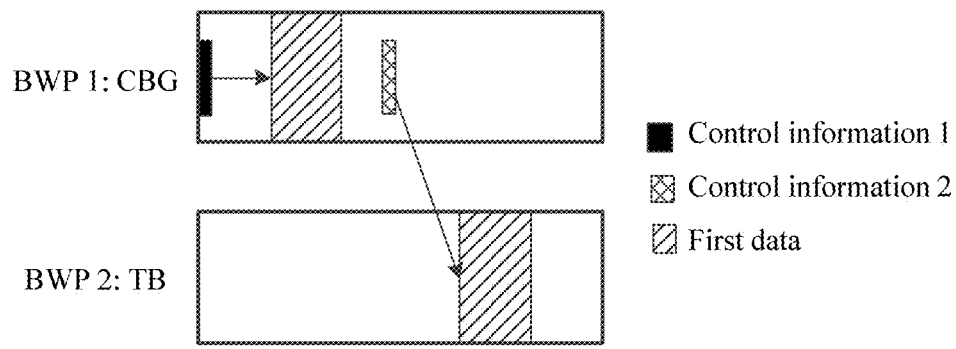
FIG. 5B is a schematic diagram 4 of data transmission according to an embodiment of this application.

Case 2: FIG. 5A is a schematic diagram 3 of data transmission according to an embodiment of this application. FIG. 5B is a schematic diagram 4 of data transmission according to an embodiment of this application. As shown in FIG. 5A and FIG. 5B, after the network device and the terminal device transmit the first data on the BWP 1 based on a CBG, the network device schedules, by using the control information, the network device and the terminal device to transmit all of the first data on the BWP 2 based on a TB. In other words, the first transmission mode supported by the BWP 1 is CBG-based transmission, and the second transmission mode supported by the BWP 2 is TB-based transmission. Optionally, the network device may send the control information, for example, control information 2 shown in FIG. 5A, to the terminal device on the BWP 1. The network device may alternatively send the control information, for example, control information 2 shown in FIG. 5B, to the terminal device on the BWP 2. Control information 1 shown in FIG. 5A and FIG. 5B is the control information used to schedule the first data transmitted between the network device and the terminal device on the BWP 1.

In this embodiment, although the k$^{th}$ transmission is the CBG-based transmission, the (k+1)$^{th}$ transmission is the TB-based transmission. Even though the network device and the terminal device send the first data in an HARQ-ACK information-based feedback manner, and only a part of the first data fails to be received, the entire first data still needs to be retransmitted in the (k+1)$^{th}$ transmission. Therefore, all of the first data needs to be transmitted when the network device transmits the first data with the terminal device on the BWP 2 based on the TB. Therefore, in the following several manners, the network device may indicate, by using the control information, that specific data in the first data is transmitted on the BWP 2. Details are as follows:

Manner 1: The control information sent by the network device to the terminal device does not include a first indicator field. In this implementation, the network device indicates, in a manner in which the control information indicates whether the entire TB is scheduled, that all of the first data is scheduled and transmitted on the BWP 2.

In this implementation, when the terminal device is the receive end, and the network device sends the first data with the terminal device in the HARQ-ACK information-based feedback manner, after receiving all of the first data sent by the network device on the BWP 2, the terminal device may feed back a receiving status of the TB of the first data. That is, the terminal device processes the first data through the TB-based transmission, in other words, the terminal device performs a feedback for the first data by using the TB rather than the CBG as a unit.

Manner 2: When the control information is transmitted on the BWP 1, the control information sent by the network device to the terminal device may include a first indicator field, to ensure that sizes of the control information on the same BWP are the same. The sizes of the control information on the same BWP are the same, so that a quantity of times that the terminal device performs blind detection for the control information may be reduced, thereby reducing power consumption of the terminal device. In this implementation, the network device may implicitly indicate, by using a size of the control information, that all of the first data is scheduled and transmitted on the BWP 2.

In this scenario, the first indicator field in the control information does not include valid information. For example, the first indicator field includes redundancy information, or the first indicator field includes other information, and the information is not used to indicate that specific data in the first data is scheduled. In this scenario, after receiving the control information, the terminal device does not read, from the first indicator field, information indicating that specific data in the first data is transmitted.

In this implementation, when the terminal device is the receive end, and the network device sends the first data with the terminal device in the HARQ-ACK information-based feedback manner, after receiving all of the first data sent by the network device on the BWP 2, the terminal device may feed back a receiving status of the TB of the first data. That is, the terminal device processes the first data through the TB-based transmission, in other words, the terminal device performs a feedback for the first data by using the TB rather than the CBG as a unit.

Figure 6A:
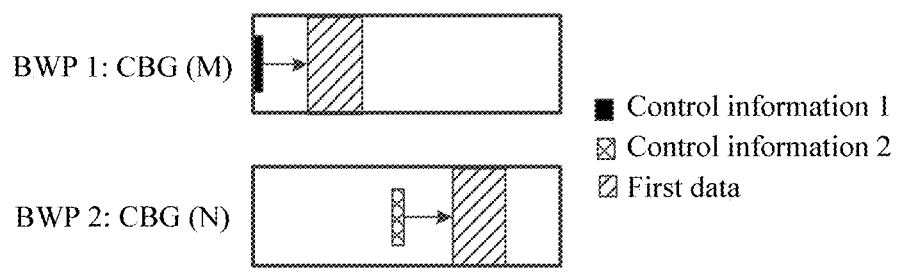
FIG. 6A is a schematic diagram 5 of data transmission according to an embodiment of this application.
Figure 6B:
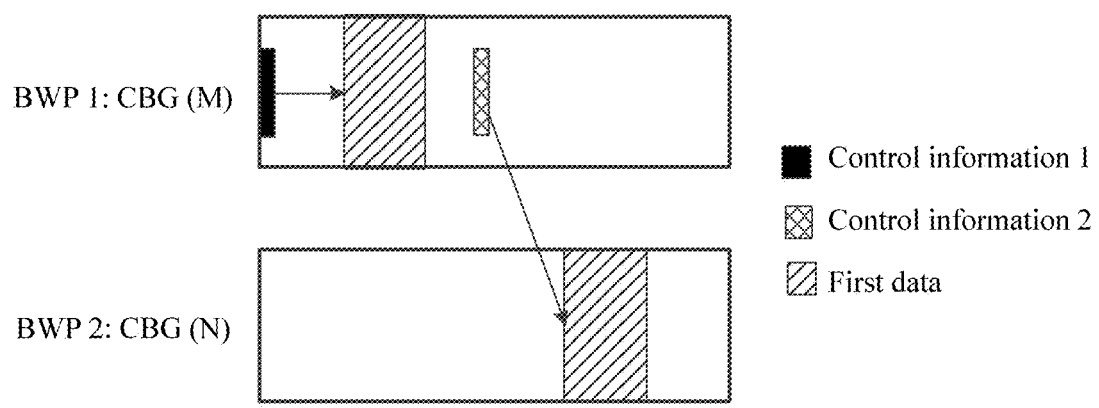
FIG. 6B is a schematic diagram 6 of data transmission according to an embodiment of this application.

Scenario 2: FIG. 6A is a schematic diagram 5 of data transmission according to an embodiment of this application. FIG. 6B is a schematic diagram 6 of data transmission according to an embodiment of this application. As shown in FIG. 6A and FIG. 6B, after the network device and the terminal device transmit the first data on the BWP 1 based on a CBG, the network device schedules, by using the control information, the network device and the terminal device to transmit all of the first data on the BWP 2 based on a CBG. In other words, the first transmission mode supported by the BWP 1 and the second transmission mode supported by the BWP 2 are CBG-based transmission. A difference lies in that a first feedback quantity M supported by the BWP 1 is different from a second feedback quantity N supported by the BWP 2. M and N are positive integers. Optionally, the network device may send the control information, for example, control information 2 shown in FIG. 6A, to the terminal device on the BWP 1. The network device may alternatively send the control information, for example, control information 2 shown in FIG. 6B, to the terminal device on the BWP 2. Control information 1 shown in FIG. 6A and FIG. 6B is the control information used to schedule the first data transmitted between the network device and the terminal device on the BWP 1.

Case 1: When the first data is transmitted on the BWP 1 and the BWP 2 respectively, data in the first data is divided into M CBGs. That is, CBG structures of the first data are the same during twice transmission. In other words, a CB included in the $i^{th}$ CBG of the first data that is transmitted on the BWP 1 is the same as a CB included in the $i^{th}$ CBG of the first data that is transmitted on the BWP 2, where i is a positive integer less than or equal to M. The first feedback quantity M supported by the BWP 1 is less than the second feedback quantity N supported by the BWP 2.

In this embodiment, if the network device and the terminal device send the first data in the HARQ-ACK information-based feedback manner, and only a part of the first data fails to be received, the part of the first data may be retransmitted in the $(k+1)^{th}$ transmission. If the network device and the terminal device send the first data in the HARQ-ACK information-based feedback manner, and all of the first data fails to be received, all of the first data may be retransmitted in the $(k+1)^{th}$ transmission. If the network device and the terminal device repeatedly send the first data a plurality of times, all of the first data may be retransmitted in the $(k+1)^{th}$ transmission. Therefore, in the following several manners, the network device may indicate, by using the control information, that specific data in the first data is transmitted on the BWP 2. Details are as follows:

Manner 1: The control information sent by the network device to the terminal device may include a first indicator field. A quantity of bits included in the first indicator field may be specifically determined based on the second feedback quantity supported by the BWP 2. The feedback quantity may also indicate a quantity of CBGs into which data in the first data is divided and a quantity of bits in HARQ-ACK information used to feed back the receiving status of the first data when the first data is transmitted on the BWP 2.

In this embodiment, the first indicator field may occupy N (the second feedback quantity supported by the BWP 2) bits, and each of first M bits in the N bits corresponds to a CBG of the first data, and is used to indicate whether the corresponding CBG is scheduled and transmitted on the BWP 2. Alternatively, each of last M bits in the N bits corresponds to a CBG of the first data, and is used to indicate whether the corresponding CBG is scheduled and transmitted on the BWP 2.

An example in which the first feedback quantity M supported by the BWP 1 is three, and the second feedback quantity N supported by the BWP 2 is five is used, in other words, the data in the first data is divided into three CBGs, that is, a CBG 0, a CBG 1, and a CBG 2 when the first data is transmitted on the BWP 2. In this case, the first indicator field may include five bits, and each of first three bits in the five bits corresponds to a CBG. To be specific, the first bit indicates whether the CBG 0 is scheduled and transmitted on the BWP 2, the second bit indicates whether the CBG 1 is scheduled and transmitted on the BWP 2, the third bit indicates whether the CBG 2 is scheduled and transmitted on the BWP 2, and the fourth bit and the fifth bit are not used to indicate whether a particular CBG is scheduled and transmitted on the BWP 2. Alternatively, the first indicator field may include five bits, and each of last three bits in the five bits corresponds to a CBG. To be specific, the third bit indicates whether the CBG 0 is scheduled and transmitted on the BWP 2, the fourth bit indicates whether the CBG 1 is scheduled and transmitted on the BWP 2, the fifth bit indicates whether the CBG 2 is scheduled and transmitted on the BWP 2, and the first bit and the second bit are not used to indicate whether a particular CBG is scheduled and transmitted on the BWP 2.

In this implementation, when the terminal device is the receive end, and the network device sends the first data with the terminal device in the HARQ-ACK information-based feedback manner, after receiving a part or all of the first data sent by the network device on the BWP 2, the terminal device may feed back a receiving status of each CBG of the first data by using the second transmission mode and the second feedback quantity that are supported by the BWP 2. In other words, when feeding back the HARQ-ACK information, the terminal device feeds back the receiving status of each CBG of the first data by using the N bits. Still refer to the foregoing example, the terminal device may perform a feedback by using five bits. For example, the terminal device divides the first data into five CBGs based on the second feedback quantity of five supported by the BWP 2, and each bit indicates a receiving status of a CBG. Alternatively, the terminal device still divides the first data into three CBGs based on the first feedback quantity supported by the BWP 1, and three bits in the five bits are used to indicate the receiving status of the three CBGs. That is, only the three bits in the five bits include valid information, and the other two bits do not include valid information, in other words, the other two bits are not used to indicate whether an actually transmitted CBG is successfully transmitted. The three bits may be first three bits, or last three bits in the five bits.

Alternatively, after receiving a part or all of the first data sent by the network device on the BWP 2, the terminal device may feed back, by using a quantity of bits corresponding to CBGs in the first indicator field as a feedback quantity, a receiving status of a CBG corresponding to each bit. That is, when feeding back the HARQ-ACK information, the terminal device feeds back the receiving status of each CBG of the first data based on a principle in which data in the first data is divided into M CBGs. Still refer to the foregoing example, the terminal device divides the data in the first data into three CBGs, and feeds back the receiving status of each CBG of the first data by using three bits in the HARQ-ACK information.

Manner 2: When the control information is transmitted on the BWP 1, the first indicator field occupies M bits, and each of the M bits corresponds to a CBG of the first data, and is used to indicate whether the corresponding CBG is scheduled. Sizes of the control information on the same BWP may be ensured to be the same in this manner. The sizes of the control information on the same BWP are the same, so that a quantity of times that the terminal device performs blind detection for the control information may be reduced, thereby reducing power consumption of the terminal device.

An example in which the first feedback quantity supported by the BWP 1 is three, and the second feedback quantity supported by the BWP 2 is five is used, in other words, the data in the first data is divided into three CBGs, that is, a CBG 0, a CBG 1, and a CBG 2 when the first data is transmitted on the BWP 2. In this case, the first indicator field may include three bits, and each of the three bits corresponds to a CBG. To be specific, the first bit indicates whether the CBG 0 is scheduled and transmitted on the BWP 2, the second bit indicates whether the CBG 1 is scheduled and transmitted on the BWP 2, and the third bit indicates whether the CBG 2 is scheduled and transmitted on the BWP 2.

In this implementation, when the terminal device is the receive end, and the network device sends the first data with the terminal device in the HARQ-ACK information-based feedback manner, after receiving a part or all of the first data sent by the network device on the BWP 2, the terminal device may feed back a receiving status of each CBG of the first data by using the second transmission mode and the second feedback quantity that are supported by the BWP 2. In other words, when feeding back the HARQ-ACK information, the terminal device feeds back the receiving status of each CBG of the first data by using the N bits. Still refer to the foregoing example, the terminal device may perform a feedback by using five bits. For example, the terminal device divides the first data into five CBGs based on the second feedback quantity of five supported by the BWP 2, and each bit indicates a receiving status of a CBG. Alternatively, the terminal device still divides the first data into three CBGs based on the first feedback quantity supported by the BWP 1, and three bits in the five bits are used to indicate the receiving status of the three CBGs. That is, only three bits in the five bits include valid information, and the other two bits do not include valid information, in other words, the other two bits are not used to indicate whether an actually transmitted CBG is successfully transmitted. The three bits may be first three bits, or last three bits in the five bits.

Alternatively, after receiving a part or all of the first data sent by the network device on the BWP 2, the terminal device may feed back, by using a quantity of bits corresponding to CBGs in the first indicator field as a feedback quantity, a receiving status of a CBG corresponding to each bit. That is, when feeding back the HARQ-ACK information, the terminal device feeds back the receiving status of each CBG of the first data based on a principle in which data in the first data is divided into M CBGs. Still refer to the foregoing example, the terminal device divides the data in the first data into three CBGs, and feeds back the receiving status of each CBG of the first data by using three bits in the HARQ-ACK information.

Manner 3: The control information includes a first indicator field, and the first indicator field does not include valid information. For example, the first indicator field includes redundancy information, or the first indicator field includes other information, and the information is not used to indicate that specific data in the first data is scheduled. In this scenario, after receiving the control information, the terminal device does not read, from the first indicator field, information indicating that specific data in the first data is transmitted. In this implementation, the network device may implicitly indicate that all of the first data is scheduled and transmitted on the BWP 2. The first indicator field occupies N bits, or when the control information is transmitted on the BWP 1, the first indicator field occupies M bits.

Optionally, when the terminal device is the receive end, and the network device sends the first data with the terminal device in the HARQ-ACK information-based feedback manner, after receiving the first data sent by the network device on the BWP 2, the terminal device may feed back a receiving status of a TB of the first data. That is, the terminal device processes the first data through the TB-based transmission, in other words, the terminal device performs a feedback for the first data by using the TB rather than the CBG as a unit. Alternatively, after receiving all of the first data sent by the network device on the BWP 2, the terminal device may feed back a receiving status of each CBG of the first data by using the second transmission mode and the second feedback quantity that are supported by the BWP 2.

Case 2: When the first data is transmitted on the BWP 1 and the BWP 2 respectively, data in the first data is divided into M CBGs. That is, CBG structures of the first data are the same during twice transmission. In other words, a CB included in the $i^{th}$ CBG of the first data that is transmitted on the BWP 1 is the same as a CB included in the $i^{th}$ CBG of the first data that is transmitted on the BWP 2, where i is a positive integer less than or equal to M. The first feedback quantity M supported by the BWP 1 is greater than the second feedback quantity N supported by the BWP 2.

In this embodiment, if the network device and the terminal device send the first data in the HARQ-ACK information-based feedback manner, and only a part of the first data fails to be received, the part of the first data may be retransmitted in the $(k+1)^{th}$ transmission. If the network device and the terminal device send the first data in the HARQ-ACK information-based feedback manner, and all of the first data fails to be received, all of the first data may be retransmitted in the $(k+1)^{th}$ transmission. If the network device and the terminal device repeatedly send the first data a plurality of times, all of the first data may be retransmitted in the $(k+1)^{th}$ transmission. Therefore, in the following several manners, the network device may indicate, by using the control information, that specific data in the first data is transmitted on the BWP 2. Details are as follows:

Manner 1: The control information sent by the network device to the terminal device may include a first indicator field. A quantity of bits included in the first indicator field may be specifically determined based on a second feedback quantity supported by the BWP 2. The feedback quantity may also indicate a quantity of CBGs into which data in the first data is divided and a quantity of bits in HARQ-ACK information used to feed back the receiving status of the first data when the first data is transmitted on the BWP 2.

In this embodiment, the first indicator field may occupy N (the second feedback quantity supported by the BWP 2) bits, and each of the N bits corresponds to at least one CBG of the first data, and is used to indicate whether the at least one corresponding CBG is scheduled and transmitted on the BWP 2. A quantity of CBGs corresponding to each of the N bits is not limited in this embodiment. For example, each of first N−1 bits in the N bits corresponds to one CBG, and the last bit corresponds to all remaining CBGs.

In some embodiments, the N bits may be divided into x bits and y bits. Each of the x bits corresponds to a CBGs, and each of the y bits corresponds to b CBGs.

In this implementation, optionally, $$x = N-1, a = \left\lceil \frac{M}{N} \right\rceil, y = 1, \text{ and } b = M - (N-1)\left\lceil \frac{M}{N} \right\rceil.$$

An example in which the first feedback quantity M supported by the BWP 1 is seven, and the second feedback quantity N supported by the BWP 2 is three is used, in other words, the data in the first data is divided into seven CBGs, that is, a CBG 0 to a CBG 6 when the first data is transmitted on the BWP 2. In this case, the first indicator field may include three bits, and each of the three bits corresponds to at least one CBG. Based on the foregoing enumerated formulas, x is 2, a is 3, y is 1, and b is 1. That is, two bits in the three bits separately correspond to three CBGs, and one bit corresponds to one CBG. To be specific, the first bit of the first indicator field indicates whether the CBG 0, the CBG 1 and the CBG 2 are scheduled and transmitted on the BWP 2, the second bit indicates whether the CBG 3, the CBG 4 and the CBG 5 are scheduled and transmitted on the BWP 2, and the third bit indicates whether the CBG 6 is scheduled and transmitted on the BWP 2. Alternatively, the first bit indicates whether the CBG 0 is scheduled and transmitted on the BWP 2, the second bit indicates whether the CBG 1, the CBG 2 and the CBG 3 are scheduled and transmitted on the BWP 2, and the third bit indicates whether the CBG 4, the CBG 5 and the CBG 6 are scheduled and transmitted on the BWP 2. That is, a quantity of CBGs corresponding to each bit in the first indicator field is arranged in ascending order or in descending order.

Alternatively, $$x = M - N\left\lfloor\frac{M}{N}\right\rfloor, a = \left\lceil\frac{M}{N}\right\rceil, y = N\left\lceil\frac{M}{N}\right\rceil - M, \text{ and } b = \left\lfloor\frac{M}{N}\right\rfloor.$$

The example in which the first feedback quantity M supported by the BWP 1 is seven, and the second feedback quantity N supported by the BWP 2 is three is still used, in other words, the data in the first data is divided into seven CBGs, that is, a CBG 0 to a CBG 6 when the first data is transmitted on the BWP 2. In this case, the first indicator field may include three bits, and each of the three bits corresponds to at least one CBG. Based on the foregoing enumerated formulas, x is 1, a is 3, y is 2, and b is 2. That is, one bit in the three bits corresponds to three CBGs, and two bits separately correspond to two CBGs. To be specific, the first bit of the first indicator field indicates whether the CBG 0, the CBG 1 and the CBG 2 are scheduled and transmitted on the BWP 2, the second bit indicates whether the CBG 3 and the CBG 4 are scheduled and transmitted on the BWP 2, and the third bit indicates whether the CBG 5 and the CBG 6 are scheduled and transmitted on the BWP 2. Alternatively, the first bit indicates whether the CBG 0 and the CBG 1 are scheduled and transmitted on the BWP 2, the second bit indicates whether the CBG 2 and the CBG 3 are scheduled and transmitted on the BWP 2, and the third bit indicates whether the CBG 4, the CBG 5 and the CBG 6 are scheduled and transmitted on the BWP 2. That is, a quantity of CBGs corresponding to each bit in the first indicator field is arranged in ascending order or in descending order.

In this embodiment, when the terminal device is the receive end, and the network device sends the first data with the terminal device in the HARQ-ACK information-based feedback manner, after receiving a part or all of the first data sent by the network device on the BWP 2, the terminal device may feed back a receiving status of each CBG of the first data by using the second transmission mode and the second feedback quantity that are supported by the BWP 2. When feeding back the HARQ-ACK information, the terminal device feeds back the receiving status of each CBG of the first data based on a principle in which data in the first data is divided into N CBGs. Still refer to the foregoing example, the terminal device divides the data in the first data into three CBGs, and feeds back the receiving status of each CBG of the first data by using three bits in the HARQ-ACK information.

Alternatively, after receiving a part or all of the first data sent by the network device on the BWP 2, the terminal device may feed back, by using a quantity of bits corresponding to CBGs in the first indicator field as a feedback quantity, a receiving status of a CBG corresponding to each bit. That is, when feeding back the HARQ-ACK information, the terminal device feeds back the receiving status of each CBG of the first data by using at least one CBG corresponding to each bit in the first indicator field based on a principle in which data in the first data is divided into M CBGs. Still refer to the foregoing example, the terminal device divides the data in the first data into seven CBGs, and feeds back the receiving status of each CBG of the first data by using three bits in the HARQ-ACK information. At least one CBG corresponding to each bit may be determined based on the foregoing at least one CBG corresponding to each bit in the first indicator field.

Manner 2: When the control information is transmitted on the BWP 1, the first indicator field occupies M bits, and each of the M bits corresponds to a CBG of the first data, and is used to indicate whether the corresponding CBG is scheduled. Sizes of the control information on the same BWP may be ensured to be the same in this manner. The sizes of the control information on the same BWP are the same, so that a quantity of times that the terminal device performs blind detection for the control information may be reduced, thereby reducing power consumption of the terminal device.

An example in which the first feedback quantity supported by the BWP 1 is seven, and the second feedback quantity supported by the BWP 2 is three is used, in other words, the data in the first data is divided into seven CBGs, that is, a CBG 0 to a CBG 6 when the first data is transmitted on the BWP 2. In this case, the first indicator field may include seven bits, and each of the three bits corresponds to a CBG.

In this implementation, when the terminal device is the receive end, and the network device sends the first data with the terminal device in the HARQ-ACK information-based feedback manner, after receiving a part or all of the first data sent by the network device on the BWP 2, the terminal device may feed back a receiving status of each CBG of the first data by using the second transmission mode and the second feedback quantity that are supported by the BWP 2. When feeding back the HARQ-ACK information, the terminal device feeds back the receiving status of each CBG of the first data based on a principle in which data in the first data is divided into N CBGs. Still refer to the foregoing example, the terminal device divides the data in the first data into three CBGs, and feeds back the receiving status of each CBG of the first data by using three bits in the HARQ-ACK information.

Alternatively, after receiving a part or all of the first data sent by the network device on the BWP 2, the terminal device may feed back, by using a quantity of bits corresponding to CBGs in the first indicator field as a feedback quantity, a receiving status of a CBG corresponding to each bit. That is, when feeding back the HARQ-ACK information, the terminal device feeds back the receiving status of each CBG of the first data based on a principle in which data in the first data is divided into M CBGs. Still refer to the foregoing example, the terminal device divides the data in the first data into seven CBGs, and feeds back the receiving status of each CBG of the first data by using seven bits in the HARQ-ACK information.

Manner 3: The control information includes a first indicator field, and the first indicator field does not include valid information. For example, the first indicator field includes redundancy information, or the first indicator field includes other information, and the information is not used to indicate that specific data in the first data is scheduled. In this scenario, after receiving the control information, the terminal device does not read, from the first indicator field, information indicating that specific data in the first data is transmitted. In this implementation, the network device may implicitly indicate that all of the first data is scheduled and transmitted on the BWP 2. The first indicator field occupies N bits, or when the control information is transmitted on the BWP 1, the first indicator field occupies M bits.

Optionally, when the terminal device is the receive end, and the network device sends the first data with the terminal device in the HARQ-ACK information-based feedback manner, after receiving the first data sent by the network device on the BWP 2, the terminal device may feed back a receiving status of a TB of the first data. That is, the terminal device processes the first data through the TB-based transmission, in other words, the terminal device performs a feedback for the first data by using the TB rather than the CBG as a unit. Alternatively, after receiving all of the first data sent by the network device on the BWP 2, the terminal device may feed back a receiving status of each CBG of the first data by using the second transmission mode and the second feedback quantity that are supported by the BWP 2.

Case 3: When the first data is transmitted on the BWP 1, data in the first data is divided into M CBGs. When the first data is transmitted on the BWP 2, data in the first data is divided into N CBGs. M is not equal to N. That is, CBG structures of the first data are different during twice transmission. In other words, a CB included in the CBG of the first data that is transmitted on the BWP 1 is completely different from or partially different from a CB included in the CBG of the first data that is transmitted on the BWP 2, where i is a positive integer, and is less than or equal to a minimum value of M and N.

In this embodiment, in the following manners, the network device may indicate, by using the control information, that specific data in the first data is transmitted on the BWP 2. Details are as follows:

Manner 1: The control information includes a first indicator field, the first indicator field occupies N bits, and each of the N bits corresponds to a CBG in the N CBGs, and is used to indicate whether the corresponding CBG is scheduled. That is, each bit in the first indicator field corresponds to a CBG obtained through division based on a feedback quantity supported by the BWP 2 when the first data is transmitted on the BWP 2.

If the network device and the terminal device send the first data in an HARQ-ACK information-based feedback manner, and a part of the first data fails to be received, the part of the first data may be retransmitted in the $(k+1)^{th}$ transmission. If the data that fails to be received belongs to data in a particular CBG obtained through division based on the feedback quantity supported by the BWP 2, the network device may retransmit the CBG on the BWP 2, and indicate, by using a bit corresponding to the CBG in the first indicator field, that the CBG is scheduled and transmitted on the BWP 2. If the network device and the terminal device send the first data in the HARQ-ACK information-based feedback manner, and all of the first data fails to be received, all of the first data may be retransmitted in the $(k+1)^{th}$ transmission. The network device may indicate, by using the first indicator field based on CBGs obtained through division based on the feedback quantity supported by the BWP 2, that the CBGs are scheduled and transmitted on the BWP 2. If the network device and the terminal device repeatedly send the first data a plurality of times, the network device may indicate, by using the first indicator field based on CBGs obtained through division based on the feedback quantity supported by the BWP 2, that the CBGs are scheduled and transmitted on the BWP 2.

For example, the first feedback quantity M supported by the BWP 1 is two, and the second feedback quantity N supported by the BWP 2 is three. TBs of the first data include six CBs. Therefore, when the first data is transmitted on the BWP 1, data in the first data is divided into two CBGs, that is, a CBG 0 and a CBG 1. The CBG 0 includes a CB 0, a CB 1, and a CB 2, and the CBG 1 includes a CB 3, a CB 4, and a CB 5. When the first data is transmitted on the BWP 2, data in the first data is divided into three CBGs, that is, a CBG 0, a CBG 1 and a CBG 2. The CBG 0 includes a CB 0 and a CB 1, the CBG 1 includes a CB 2 and a CB 3, and the CBG 2 includes a CB 4 and a CB 5.

Assuming that the CBG 0 is correctly received and the CBG 1 fails to be received during the $k^{th}$ transmission, it indicates that the CB 3, the CB 4, and the CB 5 need to be retransmitted during the $(k+1)^{th}$ transmission, that is, CBs included in the CBG 1 and the CBG 2 that are obtained through division when the first data is transmitted on the BWP 2. In this scenario, the first indicator field may include three bits, and each of the three bits corresponds to a CBG. In this example, the first indicator field may be 011, and is used to indicate that the CBG 1 and the CBG 2 (that is, the CB 2, the CB 3, the CB 4, and the CB 5) that are obtained through division are scheduled and transmitted on the BWP 2 when the first data is transmitted on the BWP 2.

In this implementation, when the terminal device is the receive end, and the network device sends the first data with the terminal device in the HARQ-ACK information-based feedback manner, after receiving a part or all of the first data sent by the network device on the BWP 2, the terminal device may feed back a receiving status of each CBG of the first data by using the second transmission mode and the second feedback quantity that are supported by the BWP 2. When feeding back the HARQ-ACK information, the terminal device feeds back the receiving status of each CBG of the first data based on a principle in which data in the first data is divided into N CBGs. Still refer the foregoing example, the terminal device divides the data in the first data into three CBGs, and feeds back the receiving status of each CBG of the first data by using three bits in the HARQ-ACK information. Because a quantity of bits corresponding to CBGs in the first indicator field is the feedback quantity supported by the BWP 2, after receiving a part or all of the first data sent by the network device on the BWP 2, the terminal device may also feed back, by using the quantity of bits corresponding to the CBGs in the first indicator field as the feedback quantity, a receiving status of a CBG corresponding to each bit.

Manner 2: The control information includes a first indicator field, and the first indicator field does not include valid information. For example, the first indicator field includes redundancy information, or the first indicator field includes other information, and the information is not used to indicate that specific data in the first data is scheduled. In this scenario, after receiving the control information, the terminal device does not read, from the first indicator field, information indicating that specific data in the first data is transmitted. In this implementation, the network device may implicitly indicate that all of the first data is scheduled and transmitted on the BWP 2. The first indicator field occupies N bits, or when the control information is transmitted on the BWP 1, the first indicator field occupies M bits.

Optionally, when the terminal device is the receive end, and the network device sends the first data with the terminal device in the HARQ-ACK information-based feedback manner, after receiving the first data sent by the network device on the BWP 2, the terminal device may feed back a receiving status of a TB of the first data. That is, the terminal device processes the first data through the TB-based transmission, in other words, the terminal device performs a feedback for the first data by using the TB rather than the CBG as a unit. Alternatively, after receiving all of the first data sent by the network device on the BWP 2, the terminal device may feed back a receiving status of each CBG of the first data by using the second transmission mode and the second feedback quantity that are supported by the BWP 2.

According to the data transmission method provided in this embodiment of this application, when the network device schedules different BWPs for the terminal device for data transmission during transmitting the first data twice, and the transmission modes supported by the two BWPs are different, or the transmission modes supported by the two BWPs are the same but the feedback quantities are different, the network device may flexibly indicate currently scheduled data to the terminal device by using the control information, so that the network device may flexibly schedule the terminal device to use different frequency resources for data transmission in different scenarios, to improve transmission efficiency and transmission performance.

It should be noted that, how to indicate the currently scheduled data by the network device to the terminal device by using the control information and how to feed back the receiving status of the current data by the terminal device are described by using an example in which one TB is included during one-time data transmission in the foregoing embodiment. It should be understood by a person skilled in the art that, when a plurality of TBs may be included during one-time data transmission, regardless of the CBG-based transmission or the TB-based transmission, for each TB during one-time data transmission, the scheduled data may be indicated by using the control information in the manner enumerated in the foregoing embodiment, and a receiving status of each TB or CBGs of each TB is fed back in the manner enumerated in the foregoing embodiment. A difference lies in that when the plurality of TBs may be transmitted during one-time data transmission, a total quantity of bits occupied to feed back HARQ-ACK information is a product of a quantity of bits for feeding back HARQ-ACK information of one TB and a quantity of TBs. For example, three bits are used to feed back a receiving status of CBGs of one TB, and CBGs of two TBs may be transmitted during one-time data transmission, so that a total quantity of bits of HARQ-ACK information for feeding back a receiving status of the CBGs of the two TBs is six.

As mentioned in the foregoing embodiment, when the network device and the terminal device send the data in the HARQ-ACK information-based feedback manner, the receive end may send the HARQ-ACK information to the transmit end. When feedback times and feedback channels of a plurality of pieces of data sent in a particular time window are the same, that is, a receiving status of the plurality of pieces of data needs to be fed back at a same time and on a same channel, a plurality of pieces of HARQ-ACK information that are fed back consist of an HARQ-ACK codebook.

Currently, there are two types of HARQ-ACK codebooks, that is, a semi-static HARQ-ACK codebook and a dynamic HARQ-ACK codebook. The dynamic HARQ-ACK codebook includes a sub-codebook of TB-based transmission and a sub-codebook of CBG-based transmission.

Conventionally, if the network device aggregates carriers in a plurality of cells in a carrier aggregation (Carrier Aggregation, CA) manner, to communicate with the terminal device through the plurality of carriers, the network device may configure a manner in which the terminal device transmits data on each cell. Therefore, the terminal device may determine a quantity of bits occupied to feed back HARQ-ACK information based on configuration of the plurality of cells. Details are as follows:

For cells using the TB-based transmission, the network device may configure a quantity of TBs that may be transmitted on each cell during one-time data transmission. Therefore, the terminal device may use a maximum value for the quantity of TBs that may be transmitted during one-time data transmission as a quantity of bits occupied by HARQ-ACK information in the sub-codebook of the TB-based transmission. For example, it is assumed that the network device configures two cells for the terminal device. A CC 1 is used to send data in a cell 1 and a CC 2 is used to send data in a cell 2. If the network device configures that two TBs may be simultaneously transmitted by the CC 1 during one-time data transmission and one TB may be transmitted by the CC 2 during one-time data transmission, the terminal device may determine that each piece of HARQ-ACK information in the sub-codebook of the TB-based transmission occupies two bits. That is, the terminal device uses two bits to feed back HARQ-ACK information for each transmission of each cell.

If the network device configures that only one TB may be transmitted on each cell during one-time data transmission, or a plurality of TBs may simultaneously be transmitted during one-time data transmission, by using spatial bundling (spatial bundling, that is, a binary "and" operation is performed on feedback results of the plurality of TBs, to obtain a feedback result, and one bit is used to feed back the result), the terminal device may determine that the HARQ-ACK information in the sub-codebook of the TB-based transmission occupies one bit.

For cells using the CBG-based transmission, the network device may configure a quantity of TBs that may be transmitted on each cell during one-time data transmission, and a quantity of CBGs included in each TB. Therefore, the terminal device may use a maximum value for a product of quantities of TBs and CBGs that can be transmitted during one-time data transmission as a quantity of bits occupied by HARQ-ACK information in the sub-codebook of the CBG-based transmission. For example, it is assumed that the network device configures two cells for the terminal device. A CC 1 is used to send data in a cell 1 and a CC 2 is used to send data in a cell 2. If the network device configures that two TBs may be simultaneously transmitted by the CC 1 during one-time data transmission, each TB includes three CBGs, one TB may be transmitted by the CC 2 during one-time data transmission, and each TB includes four CBGs, the terminal device may determine that each piece of HARQ-ACK information in the sub-codebook of the CBG-based transmission occupies six bits. That is, the terminal device uses six bits to feed back HARQ-ACK information for each transmission of each cell.

However, in conventional transmissions, when the bits occupied by the HARQ-ACK information are determined, only the configuration of each cell is considered, and how to determine a quantity of bits occupied by the HARQ-ACK information is not described when one CC includes a plurality of BWPs and configuration of each BWP is different.

How to determine the quantity of bits occupied by the HARQ-ACK information by the terminal device is described by using the BWP 1 and the BWP 2 of the CC 1, and the BWP 1 and the BWP 2 of the CC 2 as an example in this embodiment of this application. Details are as follows:

By using the CC 1 and the CC 2 shown in FIG. 3 as an example, it is assumed that a transmission mode that is of the BWP 1 of the CC 1 and that is configured by the network device is the TB-based transmission, the transmission quantity is one (that is, one TB may be transmitted during each data transmission), and the feedback quantity is one (that is, the HARQ-ACK information occupies one bit to feed back the receiving status of the TB). A transmission mode that is of the BWP 2 of the CC 1 and that is configured by the network device is the CBG-based transmission, a transmission quantity is two (that is, two TBs may be transmitted during each data transmission), and a feedback quantity is three (that is, each TB is divided into three CBGs, and the HARQ-ACK information occupies three bits to feed back a receiving status of the CBGs of the TB). A transmission mode that is of the BWP 1 of the CC 2 and that is configured by the network device is the TB-based transmission, a transmission quantity is two (that is, two TBs may be transmitted during each data transmission), and a feedback quantity is two (that is, the HARQ-ACK information occupies two bits to feed back a receiving status of the two TBs). A transmission mode that is of the BWP 2 of the CC 2 and that is configured by the network device is the CBG-based transmission, a transmission quantity is one (that is, one TB may be transmitted during each data transmission), and a feedback quantity is five (that is, each TB is divided into five CBGs, and the HARQ-ACK information occupies five bits to feed back a receiving status of the CBGs of the TB).

In this embodiment, for the sub-codebook of the TB-based transmission corresponding to the TB-based transmission, the terminal device may use a maximum value for a quantity of TBs that can be transmitted during one-time data transmission in all BWPs (including BWPs of the CC 1 and BWPs of the CC 2) as a quantity of bits occupied by the HARQ-ACK information in the sub-codebook of the TB-based transmission. In this example, the quantity 2 of TBs that can be transmitted by the BWP 1 of the CC 2 during one-time data transmission is the maximum value. If the network device does not configure the BWP 1 of the CC 2 to use spatial bundling, it may be determined that two bits are occupied by the HARQ-ACK information in the sub-codebook of the TB-based transmission. That is, regardless of whether the TB-based transmission occurs on the BWP 1 of the CC 1 or the BWP 1 of the CC 2, the terminal device feeds back two-bit HARQ-ACK information for each transmission. That is, when the network device configures a plurality of BWPs for each CC, the terminal device may determine, based on configuration of BWPs of each CC, a quantity of bits occupied by the HARQ-ACK information in the sub-codebook of the TB-based transmission.

For the sub-codebook of the CBG-based transmission corresponding to the CBG-based transmission, the terminal device may use a maximum value for a product of quantities of TBs and CBGs that can be transmitted during one-time data transmission in all BWPs (including BWPs of the CC 1 and BWPs of the CC 2) as a quantity of bits occupied by HARQ-ACK information in the sub-codebook of the CBG-based transmission. In this example, a product of quantities of TBs and CBGs that can be transmitted by the BWP 2 of the CC 1 during one-time data transmission is six, and a product of quantities of TBs and CBGs that can be transmitted by the BWP 2 of the CC 2 during one-time data transmission is five. That is, the product 6 of the quantities of TBs and CBGs that can be transmitted by the BWP 2 of the CC 1 during one-time data transmission is the maximum value. Therefore, the terminal device may determine that six bits are occupied by the HARQ-ACK information in the sub-codebook of the CBG-based transmission. That is, regardless of whether the CBG-based transmission occurs on the BWP 2 of the CC 1 or BWP 2 of the CC 2, the terminal device feeds back six-bit HARQ-ACK information for each transmission. That is, when the network device configures a plurality of BWPs for each CC, the terminal device may determine, based on configuration of BWPs of each CC, a quantity of bits occupied by the HARQ-ACK information in the sub-codebook of the CBG-based transmission.

After a quantity of bits occupied by the HARQ-ACK information used when a transmission receiving status of each transmission mode is fed back is determined, a sequence of the HARQ-ACK information transmitted for each transmission mode in a same time window may be further determined in the sub-codebook. Specifically, the sequence of the HARQ-ACK information transmitted for each transmission mode may be determined in the HARQ-ACK codebook based on a second indicator field that is used to indicate the $n^{th}$ transmission of scheduled data in a current time window and that is in the control information. It may be understood that, the terminology of a downlink assignment index (DAI) in the foregoing communications system may be still used for the second indicator field in the 5G communications system. A name of the second indicator field in each communications system is not limited in this embodiment of this application. The following application file is described by using a DAI as an example.

The DAI may be further divided into a counter DAI and a total (total) DAI. In this embodiment, in each CC, the TB-based transmission corresponds to a counter DAI and a total DAI, and the CBG-based transmission corresponds to a counter DAI and a total DAI. To be specific, two sets of DAIS are used to count data transmitted in different transmission modes in a time window, that is, the TB-based transmission and the CBG-based transmission are separately counted. It should be noted that, specific transmission corresponding to a counter DAI and a total DAI that are carried in the control information sent by the network device in the time window may be based on configuration of a BWP that is used to schedule transmitted data by the control information.

Figure 7:
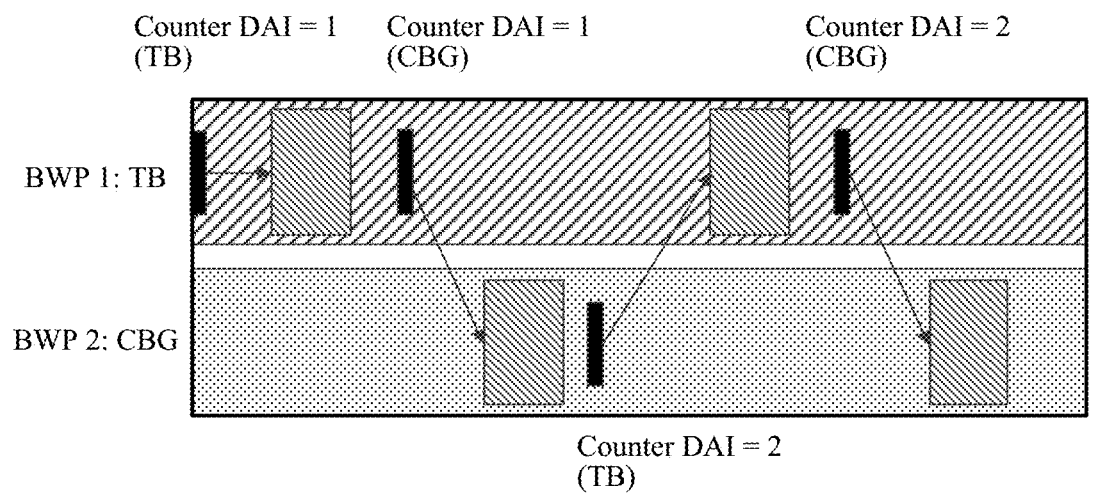
FIG. 7 is a schematic diagram 7 of data transmission according to an embodiment of this application.

FIG. 7 is a schematic diagram 7 of data transmission according to an embodiment of this application. As shown in FIG. 7, it is assumed that a CC includes a BWP 1 and a BWP 2, a first transmission mode supported by the BWP 1 is TB-based transmission, and a second transmission mode supported by the BWP 2 is CBG-based transmission. Therefore, if control information sent in a time window schedules data to transmit on the BWP 1, a counter DAI and a total DAI that are carried in the control information is a counter DAI and a total DAI of the TB-based transmission. If control information sent in a time window schedules data to transmit on the BWP 2, a counter DAI and a total DAI that are carried in the control information is a counter DAI and a total DAI of the CBG-based transmission.

In this way, when feeding back a receiving status of each transmission in the time window, the terminal device may determine, based on a transmission mode supported by a BWP that is used during this transmission, that HARQ-ACK information during this transmission should be fed back in a specific sub-codebook, and may determine a sequence of the HARQ-ACK information in the sub-codebook based on the counter DAI in the control information that schedules the data for transmission.

In the foregoing manner, the terminal device may accurately determine, based on configuration of each BWP of each CC, a quantity of bits occupied by the HARQ-ACK information, and may determine, based on the control information that schedules data for transmission each time, the sequence of the HARQ-ACK information corresponding to the transmission in the sub-codebook, so that the terminal device may accurately feed back the receiving status of the data, to improve data transmission efficiency.

Figure 8:
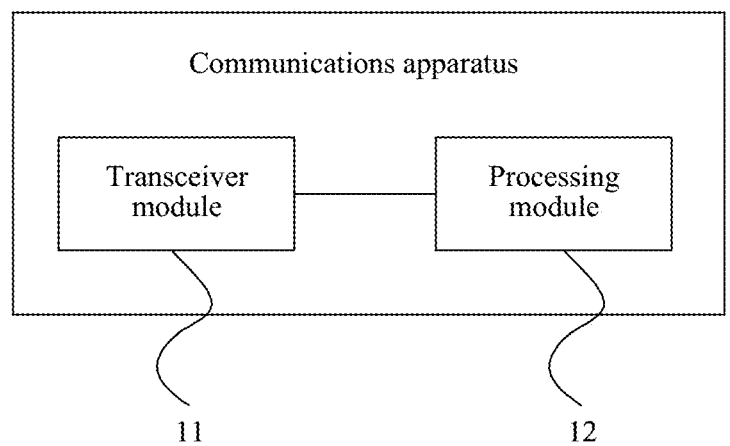
FIG. 8 is a schematic structural diagram of a communications apparatus according to an embodiment of this application.

FIG. 8 is a schematic structural diagram of a communications apparatus according to an embodiment of this application. The communications apparatus implements some or all functions of the foregoing network device by using software, hardware, or a combination thereof. The communications apparatus may be a network device or may be a chip applied to a network device. As shown in FIG. 8, the communications apparatus may include a transceiver module 11 and a processing module 12.

The transceiver module 11 is configured to transmit first data on a first frequency resource.

The processing module 12 is further configured to send the control information by using the transceiver module, where the control information is used to schedule a part or all of the first data transmitted on a second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource.

Optionally, when the first transmission mode is a transport block TB-based transmission, and the second transmission mode is a code block group CBG-based transmission, the control information may include a first indicator field, and each bit of the first indicator field corresponds to a CBG of the first data, and is used to indicate whether the corresponding CBG is scheduled; or the first indicator field does not include valid information (for example, the first indicator field includes redundancy information, or the first indicator field includes other information, and the information is not used to indicate that specific data in the first data is scheduled); or when the control information is transmitted on the first frequency resource, the control information does not include the first indicator field.

Optionally, when the first transmission mode is a code block group CBG-based transmission, and the second transmission mode is a transport block TB-based transmission, the control information may not include a first indicator field, and each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information (for example, the first indicator field includes redundancy information, or the first indicator field includes other information, and the information is not used to indicate that specific data in the first data is scheduled).

Optionally, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs. In this implementation, the control information includes a first indicator field, the first indicator field occupies N bits, and each of first M bits in the N bits corresponds to a CBG of the first data, and is used to indicate whether the corresponding CBG is scheduled; or each of last M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

Optionally, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs. In this implementation, the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled. For example, when the first indicator field occupies N bits, the N bits are divided into x bits and y bits; and that each of the N bits corresponds to at least one CBG of the first data includes: each of the x bits corresponds to a CBGs, and each of the y bits corresponds to b CBGs. For example, $$x = N - 18, a = \left\lceil \frac{M}{N} \right\rceil, \text{ and } y = 18, b = M - (N - 18)\left\lceil \frac{M}{N} \right\rceil, \text{ or}$$

$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

Optionally, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs. In this implementation, the control information includes a first indicator field, the first indicator field occupies N bits, and each of the N bits corresponds to a CBG in the N CBGs, and is used to indicate whether the corresponding CBG is scheduled.

Optionally, the first transmission mode and the second transmission mode are code block group CBG-based transmissions, the first feedback quantity is M, the second feedback quantity is N, M and N are positive integers, and M is not equal to N. In this implementation, the control information includes a first indicator field, the first indicator field does not include valid information (for example, the first indicator field includes redundancy information, or the first indicator field includes other information, and the information is not used to indicate that specific data in the first data is scheduled), the first indicator field occupies N bits, or when the control information is transmitted on the first frequency resource, the first indicator field occupies M bits.

The communications apparatus provided in this embodiment of this application may execute an action of the network device in the foregoing method embodiments. Implementation principles and technical effects of the communications apparatus are similar to those of the network device. Details are not described herein again.

Figure 9:
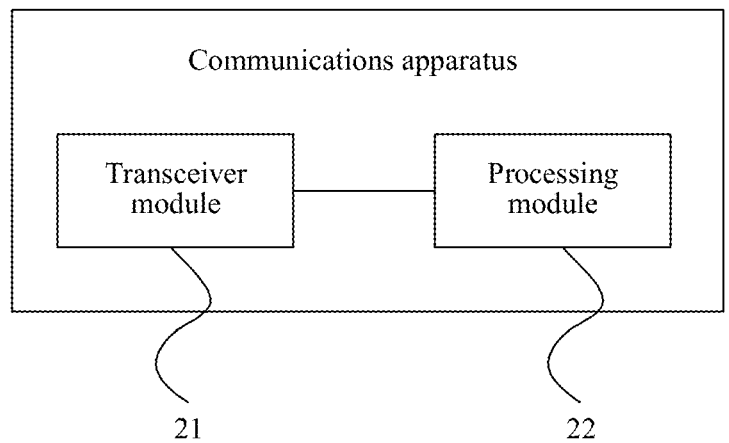
FIG. 9 is a schematic structural diagram of another communications apparatus according to an embodiment of this application.

FIG. 9 is a schematic structural diagram of another communications apparatus according to an embodiment of this application. The communications apparatus implements some or all functions of the foregoing terminal device by using software, hardware, or a combination thereof. The communications apparatus may be a terminal device or may be a chip applied to a terminal device. As shown in FIG. 9, the communications apparatus may include a transceiver module 21 and a processing module 22.

The transceiver module 21 is configured to: transmit first data on a first frequency resource, and receive control information, where the control information is used to schedule a part or all of the first data transmitted on the second frequency resource, a first transmission mode supported by the first frequency resource is different from a second transmission mode supported by the second frequency resource, or the first transmission mode is the same as the second transmission mode, but a first feedback quantity supported by the first frequency resource is different from a second feedback quantity supported by the second frequency resource.

The processing module 22 is configured to control, based on the control information, the transceiver module to transmit the first data on the second frequency resource.

Optionally, when the first transmission mode is a transport block TB-based transmission, and the second transmission mode is a code block group CBG-based transmission, the control information may include a first indicator field, and each bit of the first indicator field corresponds to a CBG of the first data, and is used to indicate whether the corresponding CBG is scheduled; or the first indicator field does not include valid information (for example, the first indicator field includes redundancy information, or the first indicator field includes other information, and the information is not used to indicate that specific data in the first data is scheduled); or when the control information is transmitted on the first frequency resource, the control information does not include the first indicator field.

Optionally, when the first transmission mode is a code block group CBG-based transmission, and the second transmission mode is a transport block TB-based transmission, the control information may not include a first indicator field, and each bit of the first indicator field corresponds to a CBG of the first data, and is used to indicate whether the corresponding CBG is scheduled; or when the control information is transmitted on the first frequency resource, the control information includes the first indicator field, but the first indicator field does not include valid information (for example, the first indicator field includes redundancy information, or the first indicator field includes other information, and the information is not used to indicate that specific data in the first data is scheduled).

Optionally, the first transmission mode and the second transmission mode are code block group CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs. In this implementation, the control information includes a first indicator field, the first indicator field occupies N bits, and each of first M bits in the N bits corresponds to a CBG of the first data, and is used to indicate whether the corresponding CBG is scheduled; or each of last M bits in the N bits corresponds to a CBG of the first data, and is used to indicate whether the corresponding CBG is scheduled; or when the control information is transmitted on the first frequency resource, the first indicator field occupies M bits, and each of the M bits corresponds to a CBG of the first data, and is used to indicate whether the corresponding CBG is scheduled.

Optionally, the first transmission mode and the second transmission mode are code block group CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs. In this implementation, the control information includes a first indicator field, the first indicator field occupies N bits, and each of the N bits corresponds to at least one CBG of the first data, and is used to indicate whether the at least one corresponding CBG is scheduled; or when the control information is transmitted on the first frequency resource, the first indicator field occupies M bits, and each of the M bits corresponds to a CBG of the first data, and is used to indicate whether the corresponding CBG is scheduled. For example, when the first indicator field occupies N bits, the N bits are divided into x bits and y bits; and that each of the N bits corresponds to at least one CBG of the first data includes: each of the x bits corresponds to a CBGs, and each of the y bits corresponds to b CBGs. For example, $$x = N - 18, a = \left\lceil \frac{M}{N} \right\rceil, \text{ and } y = 18, b = M - (N - 18)\left\lceil \frac{M}{N} \right\rceil, \text{ or}$$

$$x = M - N\left\lfloor \frac{M}{N} \right\rfloor, a = \left\lceil \frac{M}{N} \right\rceil, y = N\left\lceil \frac{M}{N} \right\rceil - M, \text{ and } b = \left\lfloor \frac{M}{N} \right\rfloor.$$

Optionally, the first transmission mode and the second transmission mode are code block group CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs. In this implementation, the control information includes a first indicator field, the first indicator field occupies N bits, and each of the N bits corresponds to a CBG in the N CBGs, and is used to indicate whether the corresponding CBG is scheduled.

Optionally, the first transmission mode and the second transmission mode are code block group CBG-based transmissions, the first feedback quantity is M, the second feedback quantity is N, M and N are positive integers, and M is not equal to N. In this implementation, the control information includes a first indicator field, the first indicator field does not include valid information (for example, the first indicator field includes redundancy information, or the first indicator field includes other information, and the information is not used to indicate that specific data in the first data is scheduled), the first indicator field occupies N bits, or when the control information is transmitted on the first frequency resource, the first indicator field occupies M bits.

Optionally, when the communications apparatus is a recipient, the transceiver module 21 is further configured to feed back a receiving status of the first data by using the second transmission mode and the second feedback quantity. Alternatively, when the communications apparatus is the recipient, the transceiver module 21 is further configured to feed back, by using a quantity of bits corresponding to CBGs in the first indicator field as a feedback quantity, a receiving status of a CBG corresponding to each bit when the control information includes the first indicator field, and the first indicator field is a valid indicator field. Alternatively, when the communications apparatus is the recipient, the transceiver module 21 is further configured to feed back a receiving status of a TB of the first data when the control information does not include the first indicator field, or the control information includes the first indicator field, but the first indicator field does not include valid information.

The communications apparatus provided in this embodiment of this application may execute an action of the terminal device in the foregoing method embodiments. Implementation principles and technical effects of the communications device are similar to those of the terminal device. Details are not described herein again.

It should be noted that, it should be understood that the transceiver module may be a transmitter and a receiver, or a transceiver during actual implementation. The processing module may be implemented in a form of invoking software by a processing element; or may be implemented in a form of hardware. For example, the processing module may be an independent processing element, or may be integrated in a particular chip of the foregoing apparatus for implementation. In addition, the processing module may be alternatively stored in a memory of the foregoing apparatus in a form of program code. The program code is invoked by a particular processing element of the foregoing apparatus to perform the functions of the foregoing processing module. In addition, some or all of the modules may be integrated together, or may be independently implemented. The processing element herein may be an integrated circuit and has a signal processing capability. In an implementation process, steps in the foregoing method or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (ASIC), one or more microprocessors (DSP), or one or more field programmable gate arrays (FPGA). For another example, when one of the foregoing modules is implemented in a form of invoking software by a processing element, the processing element may be a general-purpose processor, for example, a central processing unit (CPU) or another processor that can invoke the program code. For another example, the modules may be integrated together, and are implemented in a form of a system-on-a-chip (SOC).

Figure 10:
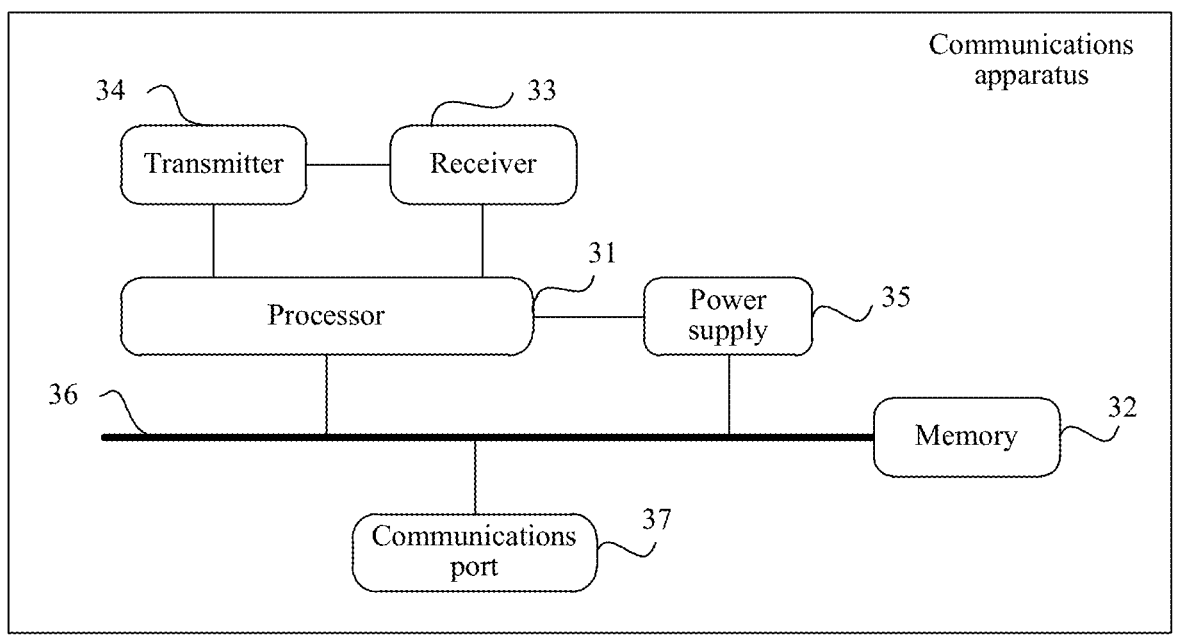
FIG. 10 is a schematic structural diagram of still another communications apparatus according to an embodiment of this application.

FIG. 10 is a schematic structural diagram of still another communications apparatus according to an embodiment of this application. As shown in FIG. 10, the communications apparatus may include: a processor 31 (for example, a CPU), a memory 32, a receiver 33, and a transmitter 34. The receiver 33 and the transmitter 34 are coupled to the processor 31, the processor 31 controls a receiving action of the receiver 33, and the processor 31 controls a sending action of transmitter 34. The memory 32 may include a high-speed random access memory (random-access memory, RAM), and may further include a nonvolatile memory (NVM), for example, at least one magnetic disk memory. The memory 32 may store various instructions used to complete various processing functions and implement method steps of this application. Optionally, the communications apparatus mentioned in this application may further include: a power supply 35, a communications bus 36, and a communications port 37. The receiver 33 and the transmitter 34 may be integrated into a transceiver of the communications apparatus, or may be independent transceiver antennas on the communications apparatus. The communications bus 36 is configured to implement a communication connection between the elements. The communications port 37 is configured to implement connection communication between the communications apparatus and another external device.

In this embodiment of this application, the memory 32 is configured to store computer-executable program code, and the program code includes an instruction. When the processor 31 executes the instruction, the instruction enables the processor 31 of the communications apparatus to execute a processing action of the network device in the foregoing method embodiments, enables the receiver 33 to execute a receiving action of the network device in the foregoing method embodiments, and enables the transmitter 34 to execute a sending action of the network device in the foregoing method embodiments. Implementation principles and technical effects of the communications apparatus are similar to those of the network device. Details are not described herein again.

Figure 11:
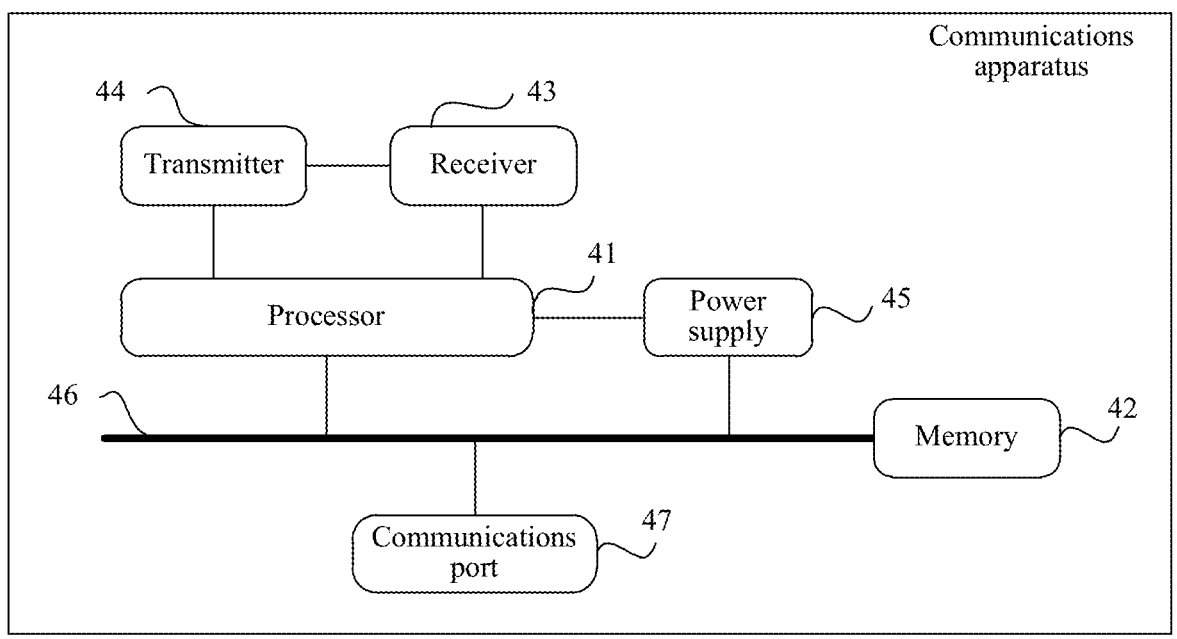
FIG. 11 is a schematic structural diagram of yet another communications apparatus according to an embodiment of this application.

FIG. 11 is a schematic structural diagram of yet another communications apparatus according to an embodiment of this application. As shown in FIG. 11, the communications apparatus may include: a processor 41 (for example, a CPU), a memory 42, a receiver 43, and a transmitter 44. The receiver 43 and the transmitter 44 are coupled to the processor 41, the processor 41 controls a receiving action of the receiver 43, and the processor 41 controls a sending action of the transmitter 44. The memory 42 may include a high-speed RAM memory, and may further include a nonvolatile memory NVM, for example, at least one magnetic disk memory. The memory 42 may store various instructions used to complete various processing functions and implement method steps of this application. Optionally, the communications apparatus mentioned in this application may further include: a power supply 45, a communications bus 46, and a communications port 47. The receiver 43 and the transmitter 44 may be integrated into a transceiver of the communications apparatus, or may be independent transceiver antennas on the communications apparatus. The communications bus 46 is configured to implement a communication connection between the elements. The communications port 47 is configured to implement connection communication between the communications apparatus and another external device.

In this application, the memory 42 is configured to store computer-executable program code, and the program code includes an instruction. When the processor 41 executes the instruction, the instruction enables the processor 41 of the communications apparatus to execute a processing action of the terminal device in the foregoing method embodiments, enables the receiver 43 to execute a receiving action of the terminal device in the foregoing method embodiments, and enables the transmitter 44 to execute a sending action of the terminal device in the foregoing method embodiments. Implementation principles and technical effects of the communications apparatus are similar to those of the terminal device. Details are not described herein again.

Some or all of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "a plurality of" in this specification means two or more than two. The term "and/or" in this specification describes only an association relationship to describe associated objects and represents that three relationships may exist. For example, A and/or B may represent the following three cases: Only A exists, both A and B exist, and only B exists. In addition, the character "/" in this specification generally indicates an "or" relationship between the associated objects; and the character "/" in the formula indicates a "divide by" relationship between the associated objects.

It may be understood that, various numerical symbols in the embodiments of this application are distinguished only for convenient description, and are not intended to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:
1. A data transmission method, comprising:
 transmitting, by a first communications apparatus, first data with a second communications apparatus on a first frequency resource; and
 sending, by the first communications apparatus, control information to the second communications apparatus,
 wherein
  the control information is used to schedule a part or all of the first data transmitted between the first communications apparatus and the second communications apparatus on a second frequency resource,
  a first transmission mode supported by the first frequency resource is:
   different from a second transmission mode supported by the second frequency resource; or
   the first transmission mode is the same as the second transmission mode, and a first feedback quantity supported by the first frequency resource is different from a second feedback quantity supported by the second frequency resource,
  at least one of the first transmission mode or the second transmission mode is a code block group (CBG)-based transmission, and
 the control information comprises a first indicator field, where each bit of the first indicator field corresponds to a CBG of the first data, and the control information is used to indicate whether the corresponding CBG is scheduled; the first indicator field does not comprise valid information; or when the control information is transmitted on the first frequency resource, the control information does not comprise the first indicator field, or
 the control information does not comprise the first indicator field, each bit of the first indicator field corresponds to a CBG of the first data, and the control information is used to indicate whether the corresponding CBG is scheduled; or when the control information is transmitted on the first frequency resource, the control information comprises the first indicator field and the first indicator field does not comprise valid information.

2. The method according to claim 1, wherein
 the first transmission mode is a transport block (TB)-based transmission, and the second transmission mode is the CBG-based transmission, and
 the control information comprises the first indicator field, where each bit of the first indicator field corresponds to a CBG of the first data, and the control information is used to indicate whether the corresponding CBG is scheduled,
 the first indicator field does not comprise valid information, or
 when the control information is transmitted on the first frequency resource, the control information does not comprise the first indicator field.

3. The method according to claim 1, wherein
 the first transmission mode is the CBG-based transmission, and the second transmission mode is a transport block (TB)-based transmission, and
 the control information does not comprise the first indicator field, each bit of the first indicator field corresponds to a CBG of the first data, and the control information is used to indicate whether the corresponding CBG is scheduled, or
 when the control information is transmitted on the first frequency resource, the control information comprises the first indicator field and the first indicator field does not comprise valid information.

4. The method according to claim 1, wherein
 the first transmission mode and the second transmission mode are both CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs, and
 the control information comprises the first indicator field, the first indicator field occupies N bits, and each of first M bits in the N bits corresponds to a CBG of the first data, and the control information is used to indicate whether the corresponding CBG is scheduled,
 each of last M bits in the N bits corresponds to a CBG of the first data, and the control information is used to indicate whether the corresponding CBG is scheduled, or
 when the control information is transmitted on the first frequency resource, the first indicator field occupies M bits, each of the M bits corresponds to a CBG of the first data, and the control information is used to indicate whether the corresponding CBG is scheduled.

5. The method according to claim 1, wherein
the first transmission mode and the second transmission mode are both CBG-based transmissions, the first feedback quantity is M, the second feedback quantity is N, M and N are positive integers, M is greater than N, and when the first data is transmitted on the first frequency resource and the second frequency resource respectively, data in the first data is divided into M CBGs, and
the control information comprises the first indicator field, the first indicator field occupies N bits, and each of the N bits corresponds to at least one CBG of the first data, and the control information is used to indicate whether the at least one corresponding CBG is scheduled, or
when the control information is transmitted on the first frequency resource, the first indicator field occupies M bits, and each of the M bits corresponds to a CBG of the first data, and the control information is used to indicate whether the corresponding CBG is scheduled.

6. The method according to claim 1, wherein
the first transmission mode and the second transmission mode are both CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs, and
the control information comprises the first indicator field, the first indicator field occupies N bits, each of the N bits corresponds to a CBG in the N CBGs, and the control information is used to indicate whether the corresponding CBG is scheduled.

7. The method according to claim 1, wherein
the first transmission mode and the second transmission mode are both CBG-based transmissions, the first feedback quantity is M, the second feedback quantity is N, M and N are positive integers, and M is not equal to N, and
the control information comprises the first indicator field, the first indicator field does not comprise valid information, and the first indicator field occupies N bits, or
when the control information is transmitted on the first frequency resource, the first indicator field occupies M bits.

8. A data transmission method, comprising:
transmitting, by a second communications apparatus, first data with a first communications apparatus on a first frequency resource;
receiving, by the second communications apparatus, control information sent by the first communications apparatus; and
transmitting, by the second communications apparatus, the first data with the first communications apparatus on a second frequency resource,
wherein
the control information is used to schedule a part or all of the first data transmitted between the first communications apparatus and the second communications apparatus on the second frequency resource,
a first transmission mode supported by the first frequency resource is:
different from a second transmission mode supported by the second frequency resource; or
the first transmission mode is the same as the second transmission mode, and a first feedback quantity supported by the first frequency resource is different from a second feedback quantity supported by the second frequency resource,
at least one of the first transmission mode or the second transmission mode is a code block group (CBG)-based transmission, and
the control information comprises a first indicator field, where each bit of the first indicator field corresponds to a CBG of the first data, and the control information is used to indicate whether the corresponding CBG is scheduled; the first indicator field does not comprise valid information; or when the control information is transmitted on the first frequency resource, the control information does not comprise the first indicator field, or
the control information does not comprise the first indicator field, each bit of the first indicator field corresponds to a CBG of the first data, and the control information is used to indicate whether the corresponding CBG is scheduled; or when the control information is transmitted on the first frequency resource, the control information comprises the first indicator field and the first indicator field does not comprise valid information.

9. The method according to claim 8, wherein
the first transmission mode is a transport block (TB)-based transmission, and the second transmission mode is the CBG-based transmission, and
the control information comprises the first indicator field, where each bit of the first indicator field corresponds to a CBG of the first data, and the control information is used to indicate whether the corresponding CBG is scheduled,
the first indicator field does not comprise valid information, or
when the control information is transmitted on the first frequency resource, the control information does not comprise the first indicator field.

10. The method according to claim 8, wherein
the first transmission mode is the CBG-based transmission, and the second transmission mode is a transport block (TB)-based transmission, and
the control information does not comprise the first indicator field, each bit of the first indicator field corresponds to a CBG of the first data, and the control information is used to indicate whether the corresponding CBG is scheduled, or
when the control information is transmitted on the first frequency resource, the control information comprises the first indicator field and the first indicator field does not comprise valid information.

11. The method according to claim 8, wherein
the first transmission mode and the second transmission mode are both CBG-based transmissions, the first feedback quantity is M, the second feedback quantity is N, M and N are positive integers, M is less than N, and when the first data is transmitted on the first frequency resource and the second frequency resource respectively, data in the first data is divided into M CBGs, and
the control information comprises the first indicator field, the first indicator field occupies N bits, and each of first M bits in the N bits corresponds to a CBG of the first data, and the control information is used to indicate whether the corresponding CBG is scheduled, or when the control information is transmitted on the first frequency resource, the first indicator field occupies M bits, each of the M bits corresponds to a CBG of the first data, and the control information is used to indicate whether the corresponding CBG is scheduled.

12. The method according to claim 8, wherein
the first transmission mode and the second transmission mode are both CBG-based transmissions, the first feedback quantity is M, the second feedback quantity is N, M and N are positive integers, M is greater than N, and
when the first data is transmitted on the first frequency resource and the second frequency resource respectively, data in the first data is divided into M CBGs, and
the control information comprises the first indicator field, the first indicator field occupies N bits, and each of the N bits corresponds to at least one CBG of the first data, and the control information is used to indicate whether the at least one corresponding CBG is scheduled, or
when the control information is transmitted on the first frequency resource, the first indicator field occupies M bits, and each of the M bits corresponds to a CBG of the first data, and the control information is used to indicate whether the corresponding CBG is scheduled.

13. The method according to claim 8, wherein
the first transmission mode and the second transmission mode are both CBG-based transmissions, the first feedback quantity is M, the second feedback quantity is N, M and N are positive integers, M is not equal to N, when the first data is transmitted on the first frequency resource, data in the first data is divided into M CBGs, and when the first data is transmitted on the second frequency resource, data in the first data is divided into N CBGs, and
the control information comprises the first indicator field, the first indicator field occupies N bits, each of the N bits corresponds to a CBG in the N CBGs, and the control information is used to indicate whether the corresponding CBG is scheduled.

14. The method according to claim 8, wherein
the first transmission mode and the second transmission mode are both CBG-based transmissions, the first feedback quantity is M, the second feedback quantity is N, M and N are positive integers, and M is not equal to N, and
the control information comprises the first indicator field, the first indicator field does not comprise valid information, and the first indicator field occupies N bits, or
when the control information is transmitted on the first frequency resource, the first indicator field occupies M bits.

15. The method according to claim 8, wherein when the second communications apparatus is a recipient, the method further comprises:
feeding back, by the second communications apparatus, a receiving status of the first data by using the second transmission mode and the second feedback quantity.

16. The method according to claim 9, wherein when the second communications apparatus is the recipient, the method further comprises:
feeding back, by the second communications apparatus by using a quantity of bits corresponding to CBGs in the first indicator field as a feedback quantity, a receiving status of a CBG corresponding to each bit when the control information comprises the first indicator field, and the first indicator field is a valid indicator field.

17. The method according to claim 9, wherein when the second communications apparatus is the recipient, the method further comprises:
feeding back, by the second communications apparatus, a receiving status of a TB of the first data when the control information does not comprise the first indicator field, or the control information comprises the first indicator field and the first indicator field does not comprise valid information.

18. A communications apparatus, comprising:
a transceiver, configured to transmit first data on a first frequency resource; and
a processor, configured to send control information by using the transceiver,
wherein
the control information is used to schedule a part or all of the first data transmitted on a second frequency resource,
a first transmission mode supported by the first frequency resource is:
different from a second transmission mode supported by the second frequency resource; or
the first transmission mode is the same as the second transmission mode, and a first feedback quantity supported by the first frequency resource is different from a second feedback quantity supported by the second frequency resource,
at least one of the first transmission mode or the second transmission mode is a code block group (CBG)-based transmission, and
the control information comprises a first indicator field, where each bit of the first indicator field corresponds to a CBG of the first data, and the control information is used to indicate whether the corresponding CBG is scheduled; the first indicator field does not comprise valid information;
or when the control information is transmitted on the first frequency resource, the control information does not comprise the first indicator field, or
the control information does not comprise the first indicator field, each bit of the first indicator field corresponds to a CBG of the first data, and the control information is used to indicate whether the corresponding CBG is scheduled; or when the control information is transmitted on the first frequency resource, the control information comprises the first indicator field and the first indicator field does not comprise valid information.

19. The apparatus according to claim 18, wherein
the first transmission mode is a transport block (TB)-based transmission, and the second transmission mode is the CBG-based transmission, and
the control information comprises the first indicator field, where each bit of the first indicator field corresponds to a CBG of the first data, and the control information is used to indicate whether the corresponding CBG is scheduled,
the first indicator field does not comprise valid information, or
when the control information is transmitted on the first frequency resource, the control information does not comprise the first indicator field.

20. The apparatus according to claim 18, wherein
the first transmission mode is the CBG-based transmission, and the second transmission mode is a transport block (TB)-based transmission, and the control information does not comprise the first indicator field, each bit of the first indicator field corresponds to a CBG of the first data, and the control information is used to indicate whether the corresponding CBG is scheduled, or when the control information is transmitted on the first frequency resource, the control information comprises the first indicator field, and the first indicator field does not comprise valid information.

* * * * *